(12) United States Patent
Singh et al.

(10) Patent No.: US 10,609,596 B2
(45) Date of Patent: Mar. 31, 2020

(54) NETWORK UTILITY MAXIMIZATION WITH MULTI-RAT AGGREGATION

(71) Applicant: Intel Corporation, Santa Clara, CA (US)

(72) Inventors: Sarabjot Singh, Santa Clara, CA (US); Shu-Ping Yeh, Campbell, CA (US); Nageen Himayat, Fremont, CA (US)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 15/765,694

(22) PCT Filed: Mar. 2, 2016

(86) PCT No.: PCT/US2016/020376
§ 371 (c)(1),
(2) Date: Apr. 3, 2018

(87) PCT Pub. No.: WO2017/062057
PCT Pub. Date: Apr. 13, 2017

(65) Prior Publication Data
US 2018/0352477 A1   Dec. 6, 2018

Related U.S. Application Data

(60) Provisional application No. 62/239,210, filed on Oct. 8, 2015.

(51) Int. Cl.
*H04W 28/08* (2009.01)
*H04W 76/15* (2018.01)
*H04W 72/04* (2009.01)
*H04W 88/12* (2009.01)

(52) U.S. Cl.
CPC ..... *H04W 28/085* (2013.01); *H04W 72/0433* (2013.01); *H04W 76/15* (2018.02); *H04W 72/0486* (2013.01); *H04W 88/12* (2013.01)

(58) Field of Classification Search
None
See application file for complete search history.

(56) References Cited

U.S. PATENT DOCUMENTS

| 2011/0270972 | A1* | 11/2011 | Mukherjee | H04L 41/0833 709/224 |
| 2013/0176988 | A1* | 7/2013 | Wang | H04W 28/08 370/331 |
| 2014/0213310 | A1 | 7/2014 | Yeh et al. | |
| 2014/0269461 | A1* | 9/2014 | Mehta | H04L 5/06 370/297 |
| 2015/0133081 | A1 | 5/2015 | Griot et al. | |

(Continued)

FOREIGN PATENT DOCUMENTS

WO   2017/062057 A1   4/2017

OTHER PUBLICATIONS

Author Unknown, Flow Control for LWA, R3-152108, Sep. 25, 2015, pp. 1-3 (Year: 2015).*

(Continued)

*Primary Examiner* — Christopher M Crutchfield
(74) *Attorney, Agent, or Firm* — Jaffery Watson Mendonsa & Hamilton LLP

(57) ABSTRACT

Apparatus, systems, and methods for network utility maximization with multiple radio access technology (multi-RAT) aggregation in communication systems are described.

6 Claims, 15 Drawing Sheets

(56) References Cited

U.S. PATENT DOCUMENTS

| | | | |
|---|---|---|---|
| 2015/0189551 A1 | 7/2015 | Azturk et al. | |
| 2015/0312831 A1* | 10/2015 | Sang | H04W 36/0083 370/236 |
| 2016/0242235 A1* | 8/2016 | Vasudevan | H04W 88/06 |
| 2017/0099625 A1* | 4/2017 | Li | H04W 28/08 |
| 2018/0206282 A1* | 7/2018 | Singh | H04W 88/06 |
| 2018/0376366 A1* | 12/2018 | Singh | H04W 24/10 |
| 2019/0182660 A1* | 6/2019 | Lee | H04L 43/10 |

OTHER PUBLICATIONS

Author Unknown, Flow Control for LWA, Oct. 9, 2015, pp. 1-4 (Year: 2015).*

Author Unknown, Discussion on Flow control for LWA, Oct. 9, 2015, pp. 1-2 (Year: 2015).*

International Search Report and Written Opinion received for International Application No. PCT/US2016/020376, dated Jun. 27, 2016, 9 pages.

International Preliminary Report on Patentability, PCT/US2016/020376, 8 pages, dated Apr. 19, 2018.

* cited by examiner

| Bits | | | | | | | | Octets |
|---|---|---|---|---|---|---|---|---|
| 7 | 6 | 5 | 4 | 3 | 2 | 1 | 0 | |
| PDU Type = 1 | | | | SPARE | | Final Frame Indicator | Lost Packet Report | 1 |
| Highest Successfully Delivered PDCP Sequence Number | | | | | | | | 2 |
| Desired Buffer Size for the E-RAB | | | | | | | | 4 |
| Highest Successfully Delivered PDCP Sequence Number | | | | | | | | 4 |
| Minimum Desired Buffer Size for the UE | | | | | | | | 1 |
| Number of Lost X2-U Sequence Number Ranges Reported | | | | | | | | |
| Start of Lost X2-U Sequence Number Range | | | | | | | | 4*(Number of Reported Lost X2-USN Ranges) |
| End of Lost X2-U Sequence Number Range | | | | | | | | |
| Spare Extension | | | | | | | | 0-4 |
| R=UE-WLAN-Rate | | | | | | | | 2 |
| Spare | | | | | | | | 2 |

FIG. 8

| 7 | 6 | 5 | 4 | 3 | 2 | 1 | 0 |
|---|---|---|---|---|---|---|---|
| D/C | \multicolumn{3}{c}{PDU Type} | R | R | R | R |
| R | \multicolumn{7}{c}{FMS} |
| \multicolumn{8}{c}{Bitmap 1 (Optional)} |

| Bitmap N (Optional) |
|---|

| WLAN Control Packet Type |
|---|
| Data 1 |
| Data 2 |
| Data 2 |

NETWORK UTILITY MAXIMIZATION WITH MULTI-RAT AGGREGATION

RELATED APPLICATIONS

This application claims the benefit of priority under 35 U.S.C. § 371 to International Application No. PCT/US2016/020376 filed Mar. 2, 2016, entitled NETWORK UTILITY MAXIMIZATION WITH MULTI-RAT AGGREGATION which in turn claims the benefit of priority under 35 U.S.C. § 119(e) of U.S. Provisional Application Ser. No. 62/239,210, filed Oct. 8, 2015, entitled CENTRALIZED, HYBRID, AND DECENTRALIZED NETWORK UTILITY MAXIMIZATION WITH MULTI-RAT AGGREGATION (C-NUM, H-NUM, D-NUM). The entire disclosure(s) of these documents are incorporated by reference herein for all purposes.

FIELD

The present disclosure generally relates to the field of electronic communication. More particularly, aspects generally relate to network utility maximization with multiple radio access technology (multi-RAT) aggregation in communication systems.

BACKGROUND

Techniques to maximize, or at least to increase, network utility in networks which utilize for multiple radio access technology aggregation may find utility, e.g., in electronic communication systems for electronic devices.

BRIEF DESCRIPTION OF THE DRAWINGS

The detailed description is provided with reference to the accompanying figures. The use of the same reference numbers in different figures indicates similar or identical items.

FIG. 8 is a schematic illustration of a delivery status block which may be used in a method for multi-user based splitting for multiple radio access technology (multi-RAT) aggregation in accordance with various examples discussed herein.

Figure 1A:
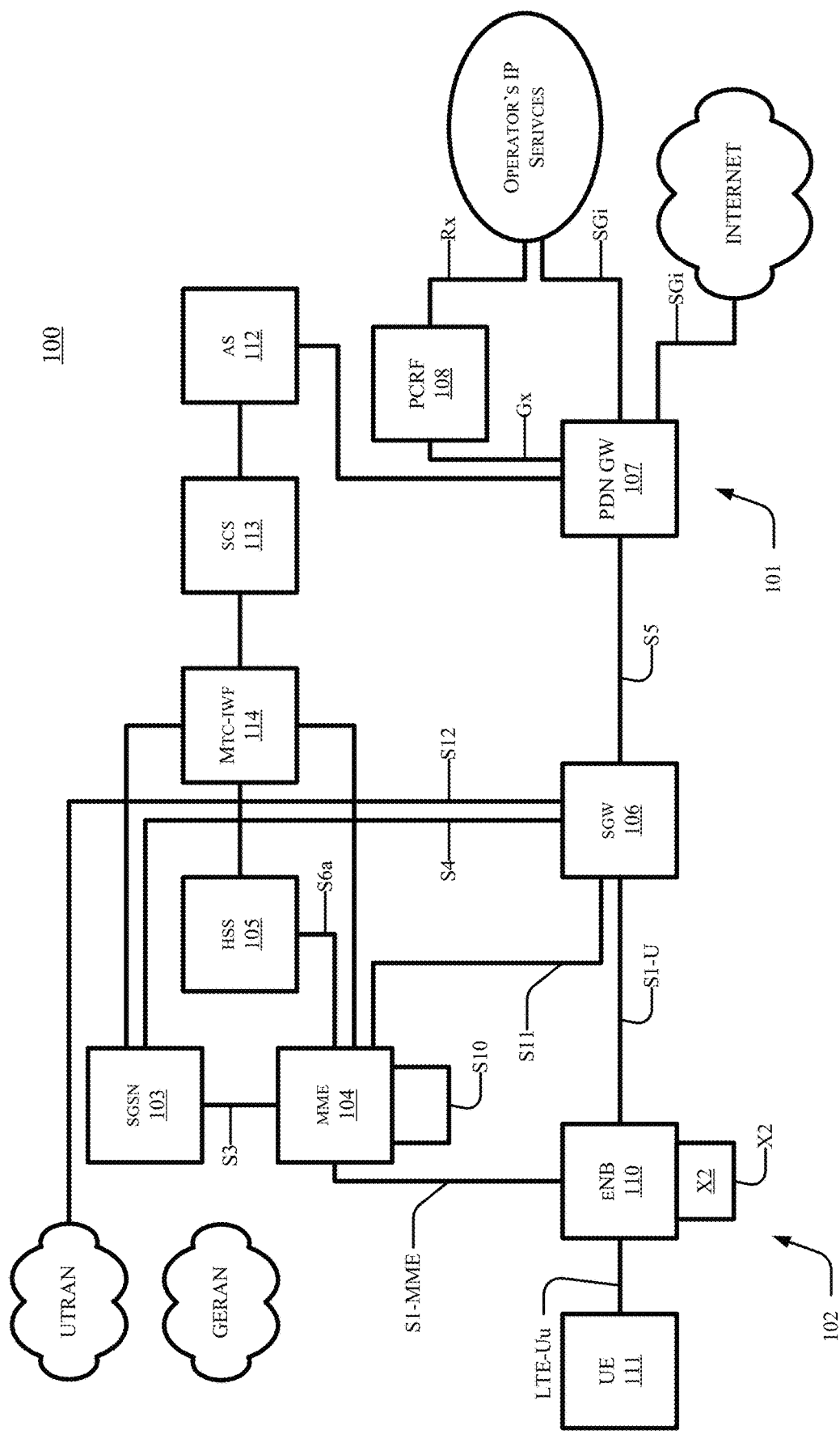
FIG. 1A is a schematic, block diagram illustration of components in a 3GPP LTE network which may implement network utility maximization with multiple radio access technology (multi-RAT) aggregation in accordance with various examples discussed herein.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following description, numerous specific details are set forth in order to provide a thorough understanding of various examples. However, various examples may be practiced without the specific details. In other instances, well-known methods, procedures, components, and circuits have not been described in detail so as not to obscure the particular examples. Further, various aspects of examples may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments.

As described in brief above, techniques to enable network utility maximization with multiple radio access technology (multi-RAT) aggregation may find utility, e.g., in electronic communication systems for electronic devices. Subject matter described herein addresses these and other issues by providing techniques to split traffic dynamically across multiple radio access technology platforms and multiple users. In some aspects the techniques described herein seek to maximize, or at least to increase, a network utility parameter associated with one or more user equipment (UEs) serviced by a given anchor base station (i.e., eNB) and one or more network access points (APs) within a geographic region services by the base station. Some algorithms described herein are based on maximizing a sum of logarithms of throughput across all UEs in the network. Various techniques described herein require only minimal exchange of information related to the state of the wireless local area network (WLAN) radio access technology (RAT), making them especially amenable to implementation with non-collocated WLAN/LTE deployments.

A first example algorithm may require an upgrade to the WLAN AP (access point) to incorporate a control interface between the WLAN AP and the eNB. A second algorithm does not require an upgrade to the existing WLAN APs. While the proposed approach is described in the context of aggregation of traffic between LTE access points (e.g., an eNB) and WLAN access points, the algorithm and associated benefits are equally applicable for aggregation across other RATs as well as multiple links across the same RAT (e.g. 5G, mm-wave RAT, WiGiG, dual connectivity link across licensed and un-licensed band, multi-channel aggregation, and across more than one RAT, etc.).

In some examples the bearer splitting algorithms may be implemented in a centralized fashion in which bearer splitting allocation decisions are implemented by an eNB and communicated to one or more UE and/or network access points (APs). In other examples the bearer splitting algorithms may be implemented in a decentralized fashion in which bearer splitting allocation decisions are implemented by the UEs and communicated to one or more APs and/or eNBs. In further examples the bearer splitting algorithms may be implemented in a hybrid fashion in which the UEs and the eNB cooperate to implement bearer splitting algorithms.

In some examples the bearer splitting algorithms may be dynamic and allow bearer splitting allocations between access points to be made on real-time measurements accounting for link quality, congestion, propagation delays, and traffic requirements for each user across LTE and WLAN access points. The algorithms may also account for changes in backhaul delay between various radio links and is robust to non ideal delays. Further, in some examples the algorithms may also be capable of automatically falling back to a non-bearer split mode of operation depending on the dynamic link quality across various radio links. The algorithms may also selectively turn off bearer splitting for bearers/users which are not expected to benefit substantially from the bearer splitting.

Additional features and characteristics these techniques and communication systems in which the techniques may be incorporated are described below with reference to FIGS. 1A-16.

FIG. 1A shows an exemplary block diagram of the overall architecture of a 3GPP LTE network 100 that includes one or more devices that are capable of implementing methods for network utility maximization with multiple radio access technology (multi-RAT) aggregation according to the subject matter disclosed herein. FIG. 1A also generally shows exemplary network elements and exemplary standardized interfaces. At a high level, network 100 comprises a core network (CN) 101 (also referred to as an evolved Packet System (EPC)), and an air-interface access network E UTRAN 102. CN 101 is responsible for the overall control of the various User Equipment (UE) connected to the network and establishment of the bearers. CN 101 may include functional entities, such as a home agent and/or an ANDSF server or entity, although not explicitly depicted. E UTRAN 102 is responsible for all radio-related functions.

The main exemplary logical nodes of CN 101 include, but are not limited to, a Serving GPRS Support Node 103, the Mobility Management Entity 104, a Home Subscriber Server (HSS) 105, a Serving Gate (SGW) 106, a PDN Gateway 107 and a Policy and Charging Rules Function (PCRF) Manager 108. The functionality of each of the network elements of CN 101 is well known and is not described herein. Each of the network elements of CN 101 are interconnected by well-known exemplary standardized interfaces, some of which are indicated in FIG. 1A, such as interfaces S3, S4, S5, etc., although not described herein.

While CN 101 includes many logical nodes, the E UTRAN access network 102 is formed by at least one node, such as evolved NodeB (base station (BS), eNB or eNodeB) 110, which connects to one or more User Equipment (UE) 111, of which only one is depicted in FIG. 1A. UE 111 is also referred to herein as a wireless device (WD) and/or a subscriber station (SS), and can include an M2M-type device. In one example, UE 111 may be coupled to eNB by an LTE-Uu interface. In one exemplary configuration, a single cell of an E UTRAN access network 102 provides one substantially localized geographical transmission point (having multiple antenna devices) that provides access to one or more UEs. In another exemplary configuration, a single cell of an E UTRAN access network 102 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 104 by an S1 MME interface and to SGW 106 by an S1 U interface. The protocols that run between the eNBs and the UEs are generally referred to as the "AS protocols." Details of the various interfaces are well known and not described herein.

The eNB 110 hosts the PHYsical (PHY), Medium Access Control (MAC), Radio Link Control (RLC), and Packet Data Control Protocol (PDCP) layers, which are not shown in FIG. 1A, and which include the functionality of user-plane header-compression and encryption. The eNB 110 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 110 covers all functions related to the radio bearers, such as radio bearer control, radio admission control, radio mobility control, scheduling and dynamic allocation of resources to UEs in both uplink and downlink, header compression for efficient use of the radio interface, security of all data sent over the radio interface, and connectivity to the EPC. The RRC layer makes handover decisions based on neighbor cell measurements sent by UE 111, generates pages for UEs 111 over the air, broadcasts system information, controls UE measurement reporting, such as the periodicity of Channel Quality Information (CQI) reports, and allocates cell-level temporary identifiers to active UEs 111. The RRC layer also executes transfer of UE context from a source eNB to a target eNB during handover, and provides integrity protection for RRC messages. Additionally, the RRC layer is responsible for the setting up and maintenance of radio bearers.

Figure 1B:
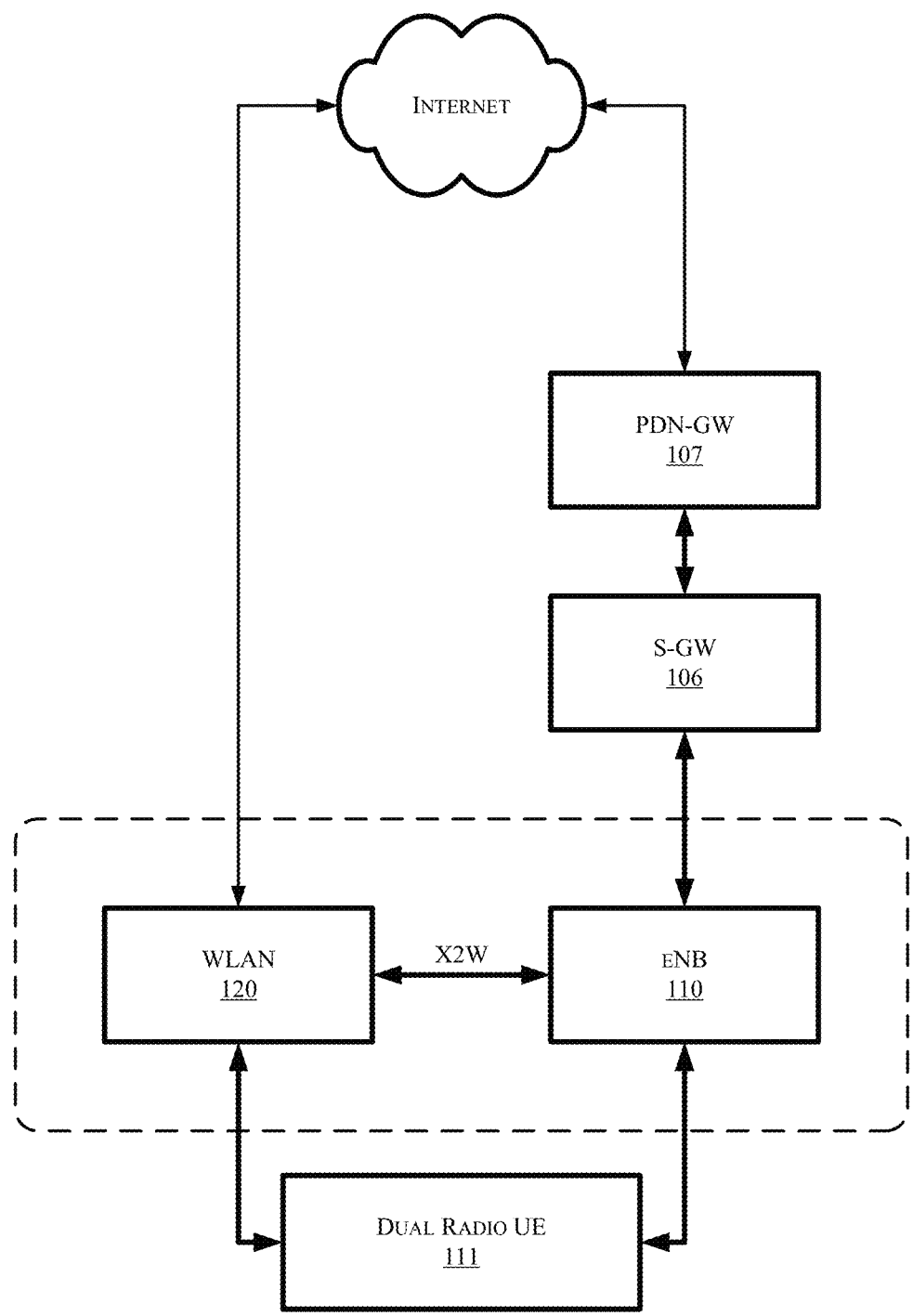
FIG. 1B is a schematic, block diagram illustration of components in a network architecture for network utility maximization with multiple radio access technology (multi-RAT) aggregation in accordance with various examples discussed herein.

FIG. 1B is a schematic, block diagram illustration of components in a network architecture for network utility maximization with multiple radio access technology (multi-RAT) aggregation in accordance with various examples discussed herein. Referring to FIG. 1B, in some examples a dual radio user equipment (UE) 111 may obtain access to a network such as the internet through multiple network radio access technologies (RATs). In the example depicted in FIG. 1B, UE 111 may access a network through one or both of a WLAN access point 120 or a cellular access point such as an such as evolved NodeB (base station (BS), eNB or eNodeB) 110, which in turn may be communicatively coupled to a serving gateway (S-GW 106) and a PDN Gateway (PDN-GW) 107.

Figure 2A:
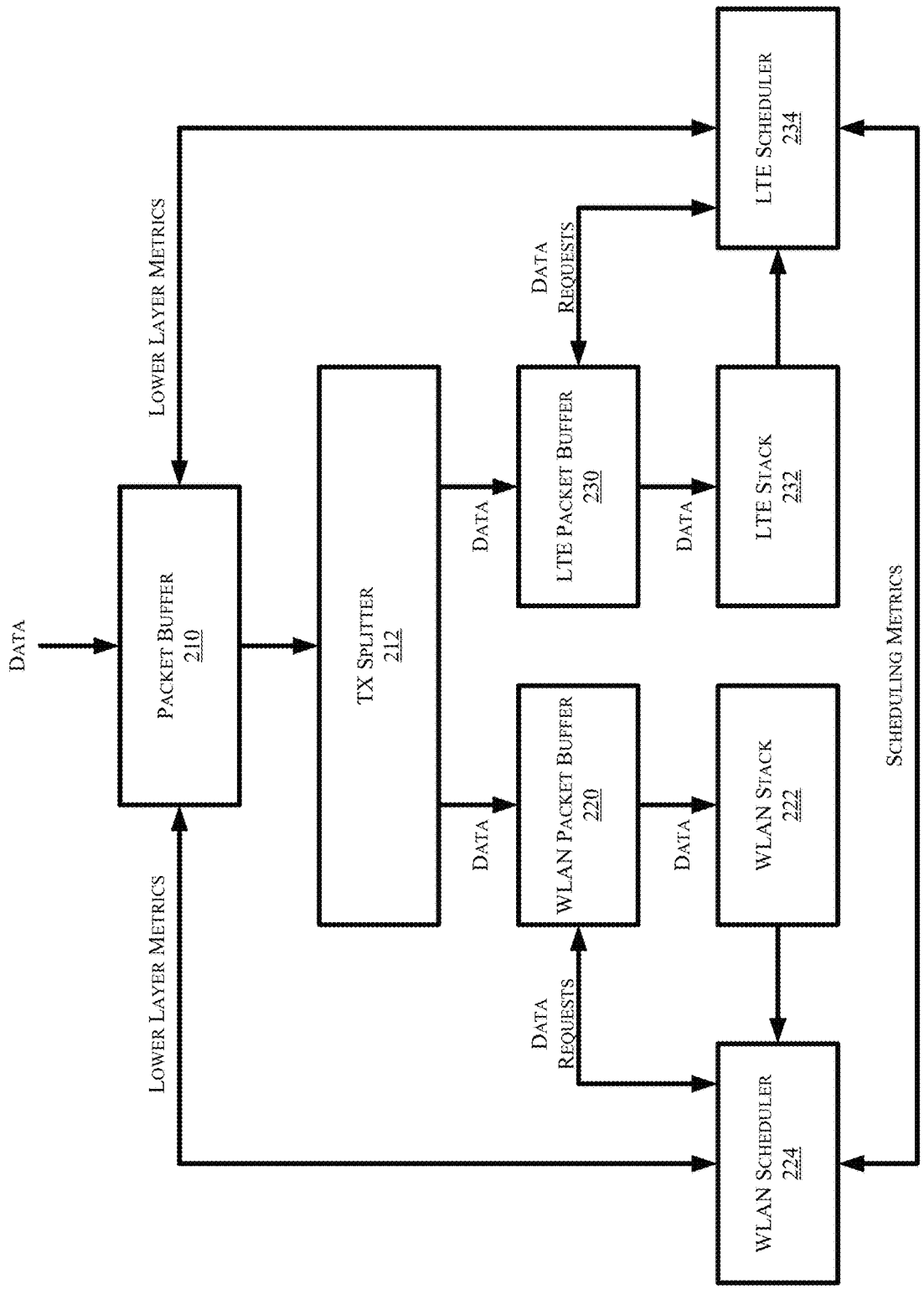
FIGS. 2A-2B are schematic, block diagram illustrations of a data architectures network utility maximization with multiple radio access technology (multi-RAT) aggregation in accordance with various examples discussed herein.

Described herein are techniques to split bearer traffic for a UE such as UE 111 between eNB access point 110 and a different radio access technology (RAT) access point such as WLAN access point 120. FIG. 2A is a schematic, block diagram illustration of a "push-based" data architecture for multi-user based splitting for multiple radio access technology (multi-RAT) aggregation in accordance with various examples discussed herein. Referring to FIG. 2A, in some examples communication data is buffered in a packet buffer 210, then provided to a transmission splitter 212, which splits the data between a WLAN packet buffer 220 and an LTE packet buffer 230. The data in the WLAN packet buffer is managed by a WLAN protocol stack 222, while the data in the LTE packet buffer is managed by an LTE protocol stack 232.

A WLAN scheduler 224 schedules the data being transmitted via the WLAN access point 120, while an LTE scheduler 234 schedules the data being transmitted via the LTE access point 130. WLAN scheduler 224 and LTE scheduler 234 may communicate to share scheduling metrics. Further, WLAN scheduler 234 and WLAN packet buffer 220 may exchange data requests. Similarly, LTE scheduler 234 and LTE packet buffer 230 may exchange data request.

Figure 2B:
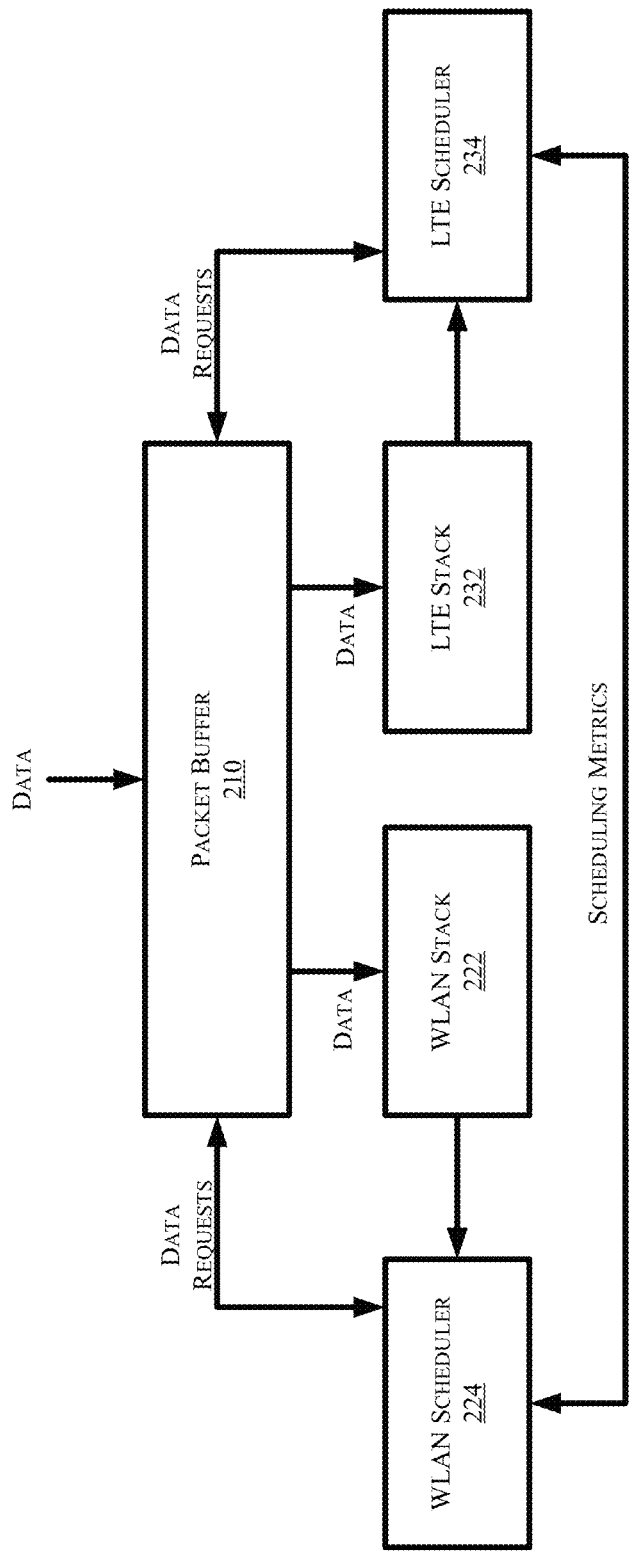

FIG. 2B is a schematic, block diagram illustration of a "pull-based" data architecture for multi-user based splitting for multiple radio access technology (multi-RAT) aggregation in accordance with various examples discussed herein. Referring to FIG. 2B, in some examples of pull-based communication data is buffered in a packet buffer 210, then provided to a transmission splitter 212, which splits the data between a WLAN protocol stack 222, while the data in the LTE packet buffer is managed by an LTE protocol stack 232.

A WLAN scheduler 224 schedules the data being transmitted via the WLAN access point 120, while an LTE scheduler 234 schedules the data being transmitted via the LTE access point 130. WLAN scheduler 224 and LTE scheduler 234 may communicate to share scheduling metrics. Further, WLAN scheduler 234 and WLAN packet buffer 220 may exchange data requests. Similarly, LTE scheduler 234 and LTE packet buffer 230 may exchange data request.

Figure 3:
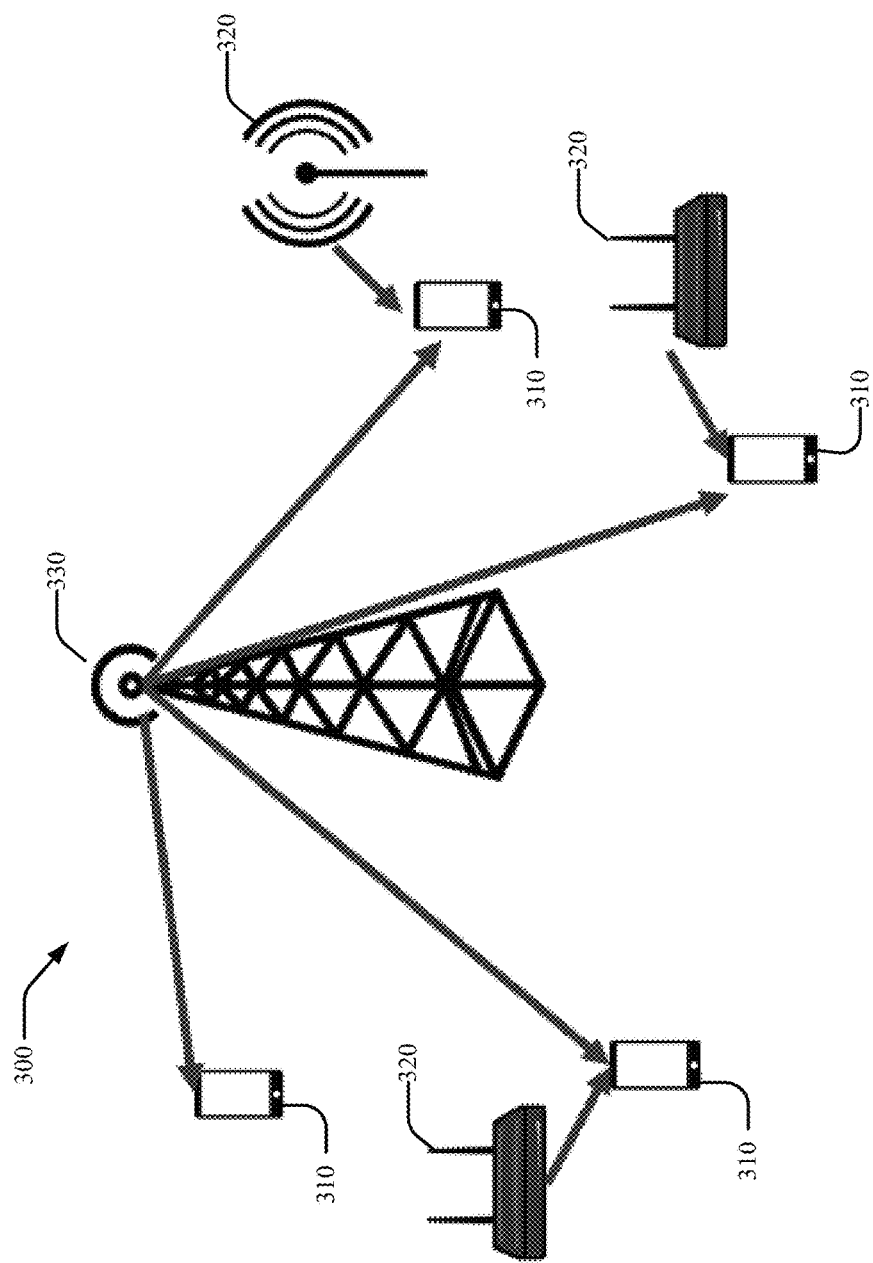
FIG. 3 is a schematic illustration of a network architecture for network utility maximization with multiple radio access technology (multi-RAT) aggregation in accordance with various examples discussed herein.

FIG. 3 is a schematic illustration of a network architecture for a communication system 300 for network utility maximization with multiple radio access technology (multi-RAT) aggregation in accordance with various examples discussed herein. System 300 may comprise one or more cells, each of which may comprise one or more sectors. Each cell comprises at least one base station (BS) 330. A plurality of UEs 310 may be located throughout system 300. System 300 may further include one or more access points 320 which may transport traffic from UEs 310 to a communication network.

A base station 310 can be embodied as, but is not limited to, an evolved NodeB (eNB or eNodeB), a macro-cell base station, a pico-cell base station, a femto-cell base station, or the like. A UE 320 can embodied as, but is not limited to, a mobile station (MS), a subscriber station (SS), a Machine-to-Machine-type (M2M-type) device, customer premises equipment (CPE), a User Equipment (UE), a notebook-type computer, a tablet-type device, a cellular telephone, a smart-type device, a smartphone, a personal digital assistant, an information-handling system, or the like as described herein. Access points 320 may be embodied as, but not limited to, WLAN access points.

Figure 4:
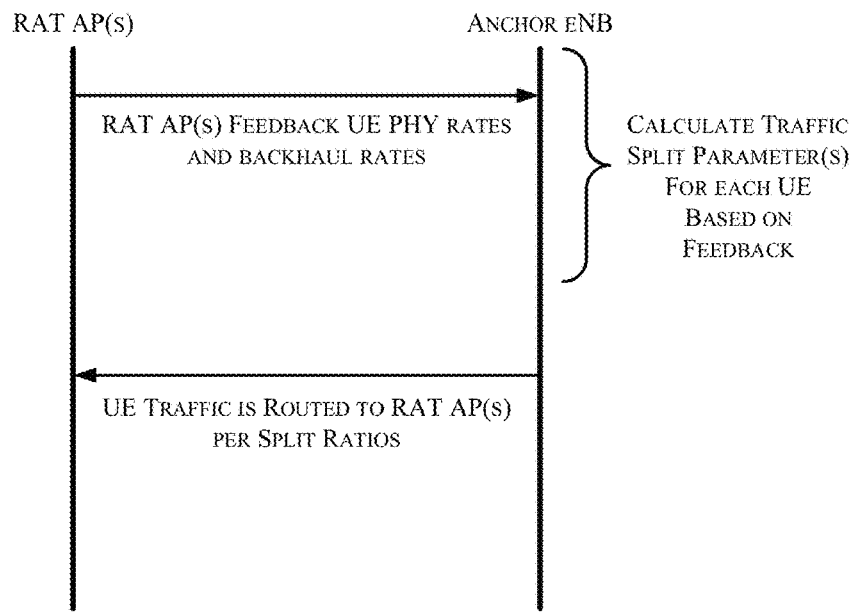
FIGS. 4-6 illustrate high-level operations in methods for network utility maximization with multiple radio access technology (multi-RAT) aggregation in accordance with various examples discussed herein.
Figure 5:
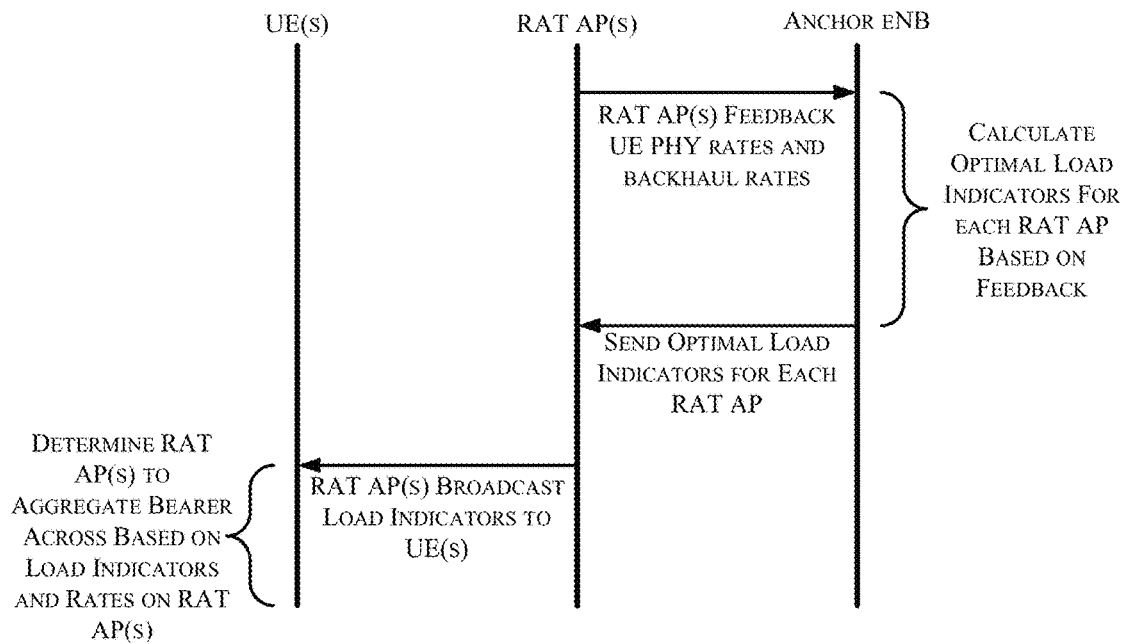
Figure 6:
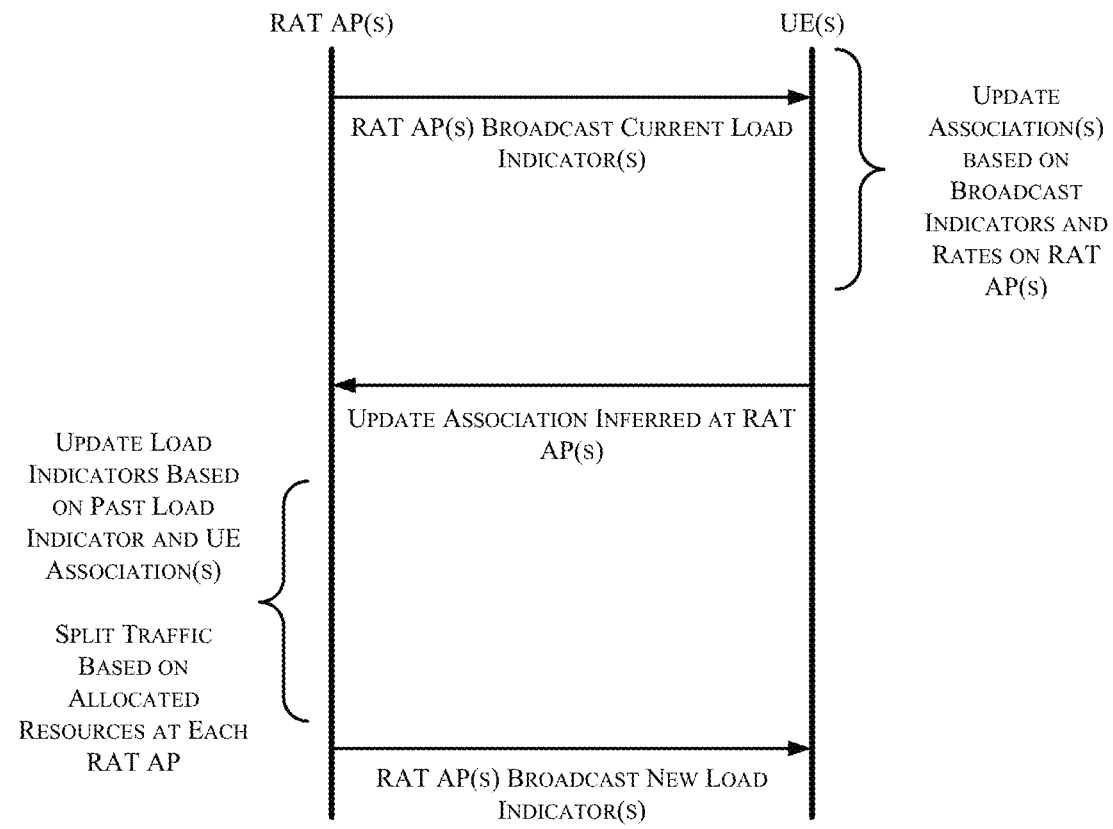

Described herein are techniques for bearer splitting which may be implemented in 3GPP LWA operation and associated signaling flows over the Xw (i.e., eNB to WLAN Termination point) or the Uu (UE to eNB). FIGS. 4-6 illustrate high-level operations in methods for network utility maximization with multiple radio access technology (multi-RAT) aggregation in accordance with various examples discussed herein.

FIG. 4 depicts operations in a centralized implementation of a method for network utility maximization with multiple radio access technology (multi-RAT) aggregation. Referring to FIG. 4, in a centralized implementation one or more RAT APs such as APs 320 depicted in FIG. 3 feedback transport parameters such as UE physical data rates and network backhaul rates to an anchor eNB such as eNB 330 depicted in FIG. 3.

In some examples the anchor eNB 330 may receive, from a first network access point 320, first transport parameters comprising a first physical data rate and a first backhaul rate for the first network access point and second transport parameters comprising a second physical data rate and a second backhaul rate for the second network access point 320. The anchor eNB 330 may use the transport parameters to determine a traffic splitting parameter comprising at least a first portion of the bearer to be allocated to the first network access point 320 and a second portion of the bearer to be allocated to the second network access point 320 in the network. The eNB 330 then allocates the first portion of the bearer to the first network access point 320 and the second portion of the bearer to the second network access point 320.

In a centralized implementation as illustrated in FIG. 4 the transport parameters may be sent directly to the eNB from the respective APs or sent to the eNB by the UEs over an LTE link. The eNB uses the parameters to determine an optimal traffic splitting parameter, i.e., a ratio for splitting the traffic between two or more APs. In some examples backhaul capacities and/or rates may be provided to the eNB via OAM configuration, or estimated through a probe/response mechanism between the eNB and other APs, or discovered by the UEs via a broadcast messaging or probe/response mechanism should the APs make this information available to the UEs.

FIG. 5 depicts operations in a hybrid implementation of a method for network utility maximization with multiple radio access technology (multi-RAT) aggregation. Referring to FIG. 5, in a hybrid implementation one or more RAT APs such as APs 320 depicted in FIG. 3 feedback transport parameters such as UE physical data rates and network backhaul rates to an anchor eNB such as eNB 330 depicted in FIG. 3.

In some examples the anchor eNB 330 may receive, from a first network access point 320, first transport parameters comprising a first physical data rate and a first backhaul rate for the first network access point 320 and second transport parameters comprising a second physical data rate and a second backhaul rate for the second network access point 320. The anchor eNB 330 may use the transport parameters to determine a first load indicator for the first network access point 320 and a second load indicator for the second network access point 320, and forward the first load indicator to the first network access point 320 and the second load indicator to the second network access point 320.

The respective access points 320 may then broadcast the load indicators to UEs 310 serviced by the eNB 330. In an example in which a bearer is split between two access points 320 the UEs 310 receive a first load indicator from a first network access point 320 and a second load indicator from a second network access point 320. The UEs determine a traffic splitting parameter comprising at least a first portion of the bearer to be allocated to the first network access point 320 and a second portion of the bearer to be allocated to the second network access point 320 in the network; and allocate the first portion of the bearer to the first network access point 320 and the second portion of the bearer to the second network access point 320.

Thus, in the hybrid implementation depicted in FIG. 5 the eNB determines a set of optimal load indicators, which are broadcasts to the UEs. The UEs use the optimal load indicators obtained from the network along with the PHY rate estimates to determine the best access points to associate/aggregate with.

FIG. 6 depicts operations in a decentralized implementation of a method for network utility maximization with multiple radio access technology (multi-RAT) aggregation. Referring to FIG. 6, in a decentralized implementation one or more APs such as network access points 320 depicted in FIG. 3 broadcast their current load indicators to at least one user equipment (UE) 310. The UE(s) 310 use the current load indicators to update their respective associations with the network access points 320 and forward the associations to the respective network access points 320. The network access points 320 receive, from the at least one UE 310, a resource allocation request for bandwidth from the network access point 320, the bandwidth used to support at least a portion of a bearer associated with the UE 310. In response to the request the network access point 320 updates load indicators based on past load indicators and the associations from the UEs and determines an allocation for transmission resources to the UE(s).

Thus, in a decentralized implementation, the optimal load indicators are not obtained centrally by the eNB, but are obtained through an iterative approach which involves sequential update of the load indicators on the respective access points, based on which the UEs execute the decision of which network access point to aggregate/associate with.

In the example depicted in FIG. 3 multiple small cells (i.e., booster cells) served by access points 320 which operate in orthogonal bands/RATs overlaid within an anchor base station's 330 coverage area. The anchor base station 330 serves UEs 310 associated with it and the UEs 310 associated with the booster cells served by access points 320. Each UE 310 has access to at most one booster small cell which may be determined by an association metric e.g. RSRP, RSRQ etc. UEs 310 simultaneously served by a small cell and anchor base station 330 aggregate traffic and the traffic may be split across the booster and anchor cell, as depicted in FIG. 1B.

The optimization problem is posed as a general α-optimal network utility maximization of the UE perceived throughput $r_u$. The objective is to determine the allocation that maximizes $$\sum_u U(r_u) \qquad \text{EQ 1}$$

subject to the criteria that $$r_u \leq \sum_{b=1}^{B} \eta_{ub} C_{u,b} \forall u = 1 \ldots B \qquad \text{EQ 2}$$

$$\sum_{u=1}^{U} \eta_{ub} = 1 \forall b = 1 \ldots B \qquad \text{EQ 3}$$

$$0 \leq \eta_{u,b} \leq 1 \forall u = 1 \ldots U \forall b = 1 \ldots B \qquad \text{EQ 4}$$

Where $C_{u,b}$ is the capacity of UE u on radio access technology (RAT) b. The design variable of the above optimization is $\eta_{u,b}$ representing the resources allocated to UE u on RAT b. The Utility for α-optimal formulation is given by $U(r)=\log(x)$ if α=1, else $U(r)=r^{\{1-\alpha\}}/\{1-\alpha\}$. Thus, proportional fairness is a special case of this formulation.

The lagragian of the optimization is written as:

$$L(\eta, r, v, \lambda) = \sum_u U(r_u) - \sum_{u=1}^{U} v_u \left( r_u - \sum_{b=1}^{B} \eta_{u,b} c_{u,b} \right) - \sum_{b=1}^{B} \lambda_b \left( \sum_{u=1}^{U} \eta_{u,b} - 1 \right)$$

$$= \sum_u U(r_u) - \sum_{u=1}^{U} v_u r_u + \sum_{b=1}^{B} \lambda_b + \sum_{u,b} \eta_{u,b}(v_u c_{u,b} - \lambda_b)$$

Where $\lambda_b$ is the optimal load indicator with RAT/BS b. Using algebraic manipulations, the program for finding optimal load indicators is (for α=1).

$$\min_{\lambda} \sum_b \lambda_b - \sum_u \log\left( \min_b \frac{\lambda_b}{c_{u,b}} \right)$$

subject to $\lambda \geq 0$.

And for α not equal to 1, it is.

$$\min_{\lambda} \sum_{b} \lambda_b + \frac{1}{\rho-1} \sum_{b} \sum_{U_b} \frac{\lambda_b^{1-\rho}}{c_{u,b}}$$

subject to $\lambda \geq 0..$

In the above equations $U_b$ is the set of users associated with RAT/BS b as per the following rule:

If $b^*(u) \triangleq \operatorname{argmax}_b \frac{c_{u,b}}{\lambda_b}$, and $U_b \triangleq \{u \text{ s.t. } b^*(u) = b\}$.  EQ 5

The optimal load indicators can be found using the following algorithm depicted in Table 1, below.

TABLE I

Optimal Load Indicator Algorithm

Algorithm 1 Optimal load indicators
1: procedure OPT-LOAD
2:  Each BS is assigned with an initial load indicators $\lambda_{b,1}$.
3:  i = 1
4:  while i ≤ Niter do
5:   Evaluate $U_{b,i}$ based on the current load indicators
6:   Compute the subgradient for each load indicator $$\nabla F(\lambda_b) = 1 - \sum_{U_{b,i}} \frac{c_{u,b}^{\rho-1}}{\lambda_{b,i}^{\rho}}$$

7:   Update the load indicator for each BS as $$\lambda_{b,i+1} = \lambda_{b,i} + \epsilon \left( \sum_{U_{b,i}} \frac{c_{u,b}^{\rho-1}}{\lambda_{b,i}^{\rho}} - 1 \right)$$

8:   i = i + 1
9:  end while
10: end procedure

The algorithm depicted in Table I can be executed in a centralized implementation, a hybrid implementation, and/or a decentralized implementation. In a centralized implementation and a hybrid implementation, the central entity (e.g., an eNB) uses the capacity of each link to calculate the optimal load indicators. In a decentralized algorithm, the operations depicted in numbers 5 through 8 are performed by UEs and RATs in an iterative manner. In Step 5, UEs associate as per metric of equation 5 using the channel quality and the current load indicators. Subsequently RAT/BSs are able to evaluate the set of users associated with them.

Using the KKT conditions, the UEs are associated to the AP(s) and/or eNB(s) based on the following criteria. The UE u associates with the AP(s) that provide the maximum capacity normalized with the corresponding load indicators. The set of APs serving UE u is given by $$b^*(u) \triangleq \operatorname{argmax}_b \frac{c_{u,b}}{\lambda_b} \quad \text{EQ 6}$$

In some examples, the bear splitting architecture can only be activated for those UEs for whom the cardinality of the set b*(u) is greater than 1. This criteria of outlining APs to serve each UE can either done centrally by network (e.g., an eNB) or in a decentralized manner by UEs, as in the hybrid and decentralized implementations described above.

For each UE, the optimal $\eta_{u,b}$ determine the traffic splitting ratios as the traffic is split in the ratio of $c_{\{u,1\}}\eta_{u,1}$: $c_{\{u,2\}}\eta_{u,2}$:$c_{\{u,b\}}\eta_{u,b}$ where 1 ... b is the index of APs among the set b*(u). Using the KKT conditions, for UEs associated with only one AP, the optimal resource fractions are simply $$\eta_{u,b^*(u)} = \frac{c_{u,b^*(u)}^{\rho-1}}{\lambda_{b^*(u)}^{\rho}} \forall u \text{ s.t. } |b^*(u)| = 1.$$

For the rest of UEs, the optimal resource fractions can be found by solving the following set of equations:

$$\sum_{b \in b^*(u)} \eta_{u,b} c_{u,b} = \max_b \left( \frac{c_{u,b}}{\lambda_b} \right)^\rho \forall u$$

$$\sum_u \eta_{u,b} = 1 \forall b.$$

A push based bearer splitting architecture is suitable for the centralized and hybrid implementations. For UEs that associate with only one AP, the resource allocation fraction is computed locally by the corresponding AP. For UEs which activate bearer splitting, the above resource allocation fractions are computed by the central entity (e.g., eNodeB/anchor) with the knowledge of the optimal load indicators.

A pull based bearer splitting architecture is suitable for the decentralized implementation, wherein the UEs request the appropriate an amount of traffic from the corresponding APs. For example, UEs that associate with only one AP request all their traffic from the corresponding APs. For the UEs which activate bearer splitting, may split their total traffic requests across APs based on the offered rates.

Figure 7A:
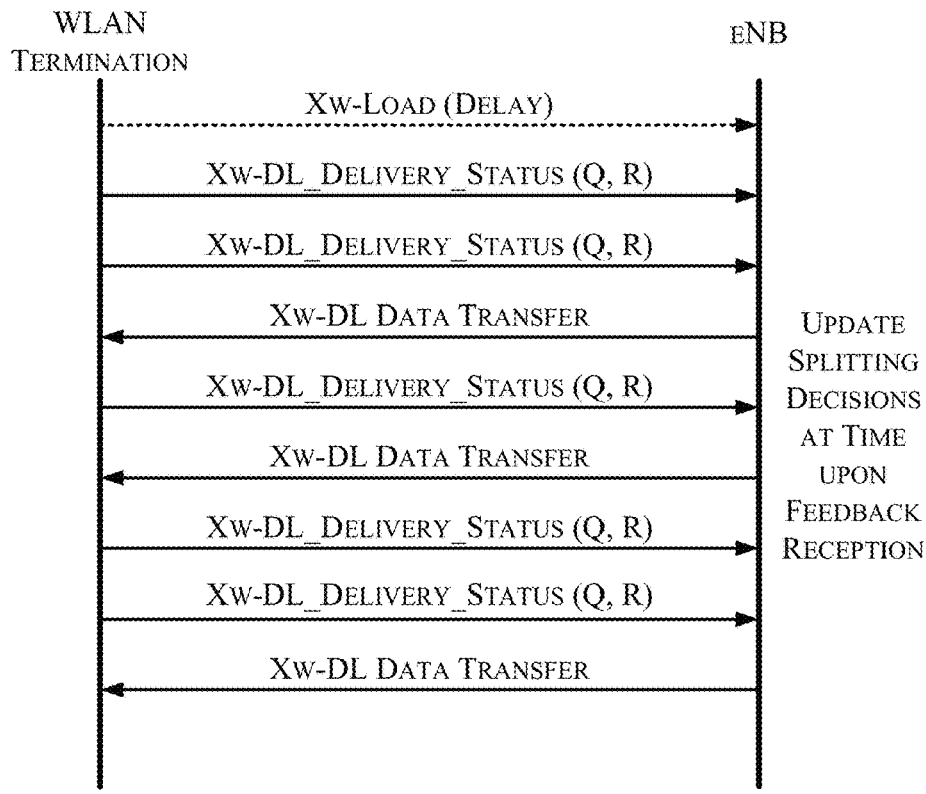
FIGS. 7A and 7B are schematic illustrations of call flows in a method for multi-user based splitting for multiple radio access technology (multi-RAT) aggregation in accordance with various examples discussed herein.
Figure 7B:
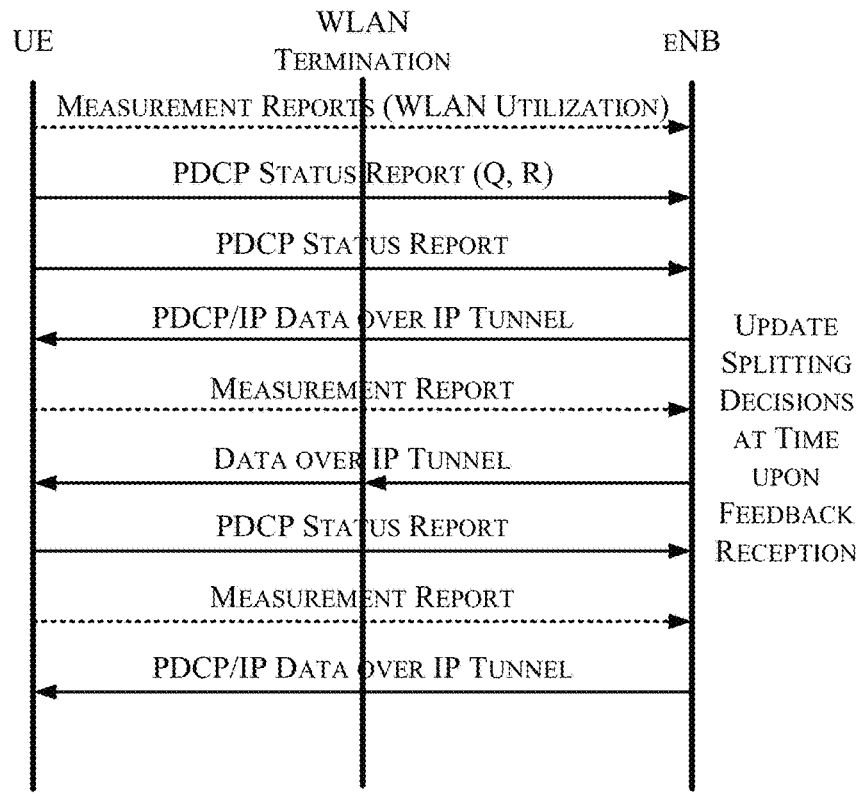

FIGS. 7A and 7B are schematic illustrations of call flows in a method for multi-user based splitting for multiple radio access technology (multi-RAT) aggregation in accordance with various examples discussed herein. FIG. 7A depicts call flows for exchanging feedback information between eNB and WLAN Termination point assuming a Xw interface based on GTP-U and X2AP extensions for dual connectivity. FIG. 7B depicts call flows for exchanging the feedback information between eNB and UE on the Uu control link.

An example of a modification to support the feedback information in the Xw-Delivery-Status information is illustrated in FIG. 8. Other extensions such as different sizes for the feedback information, etc., may also be supported. Similarly a procedure to estimate the feedback delay over the X2 link (exchange of control packets with time stamps or an ACK/NACK protocol to estimate round-trip-delay etc.) may be implemented. This information can be exchanged via Xw-Load messages and does not need to be reported as frequently as the feedback on queue states and user data rates. If the Xw interface is not available, then either the backhaul delay is configured via OAM or can be addressed by considering the end-to-end delay between the eNB and UE, via suitable signaling.

Figures 9, 10:
FIG. 9 is a schematic illustration of a PDCP status report which may be used in a method for multi-user based splitting for multiple radio access technology (multi-RAT) aggregation in accordance with various examples discussed herein.
FIG. 10 is a schematic illustration of a PDCP WLAN control packet which may be used in a method for multi-user based splitting for multiple radio access technology (multi-RAT) aggregation in accordance with various examples discussed herein.

Examples of modifications to the PDCP status report to include proposed feedback information elements within the PDCP status report and is shown in FIGS. 9 and 10. Additional formats may be supported. For example the PDCP status report may directly be extended to include the required feedback information.

Figure 11:
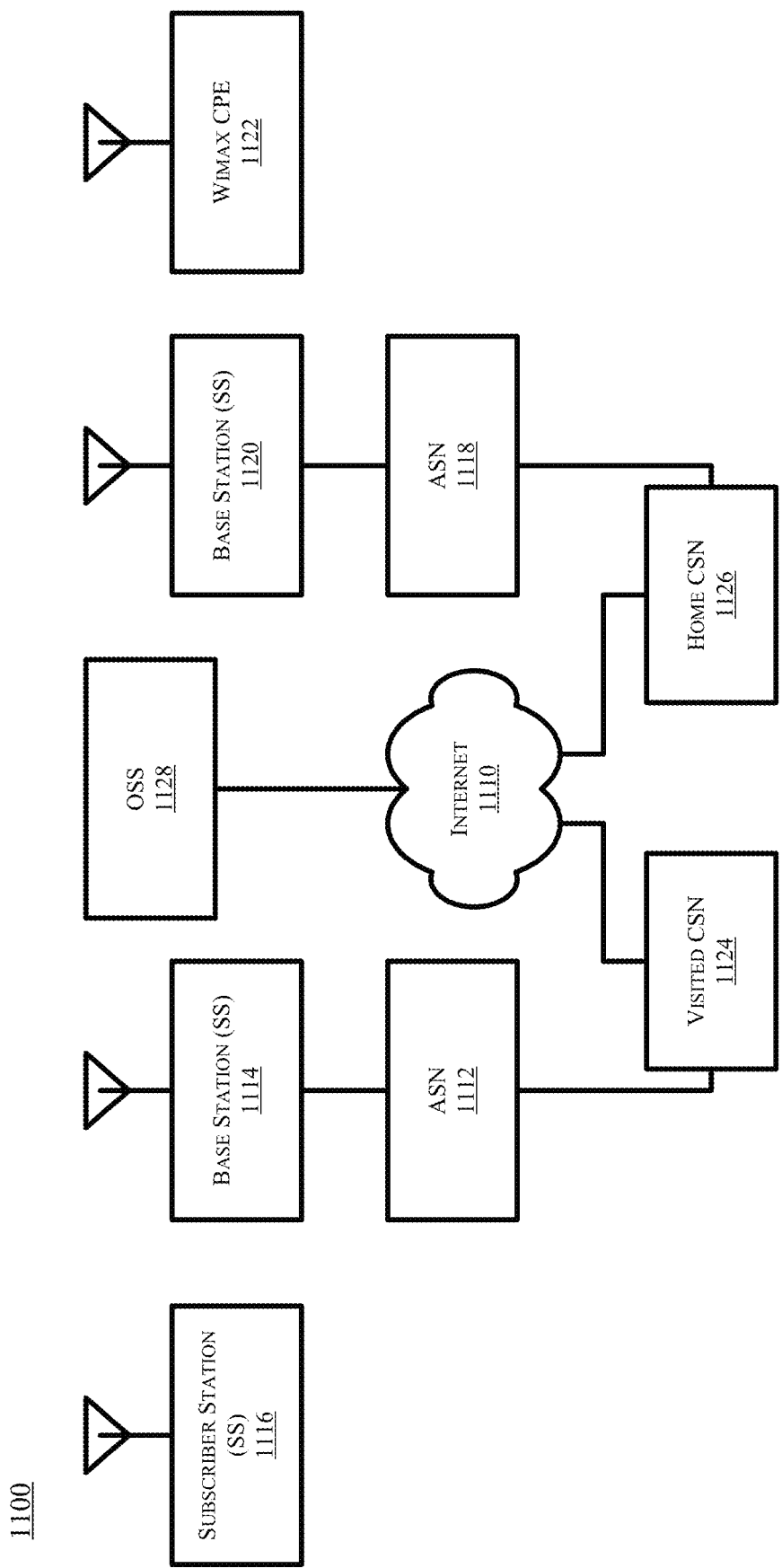
FIG. 11 is a schematic, block diagram illustration of a wireless network in accordance with one or more exemplary embodiments disclosed herein.

FIG. 11 is a schematic, block diagram illustration of a wireless network 1100 in accordance with one or more exemplary embodiments disclosed herein. One or more of the elements of wireless network 1100 may be capable of implementing methods to identify victims and aggressors according to the subject matter disclosed herein. As shown in FIG. 11, network 1100 may be an Internet-Protocol-type (IP-type) network comprising an Internet-type network 1110, or the like, that is capable of supporting mobile wireless access and/or fixed wireless access to Internet 1110.

In one or more examples, network 1100 may operate in compliance with a Worldwide Interoperability for Microwave Access (WiMAX) standard or future generations of WiMAX, and in one particular example may be in compliance with an Institute for Electrical and Electronics Engineers 802.16-based standard (for example, IEEE 802.16e), or an IEEE 802.11-based standard (for example, IEEE 802.11a/b/g/n standard), and so on. In one or more alternative examples, network 1100 may be in compliance with a 3rd Generation Partnership Project Long Term Evolution (3GPP LTE), a 3GPP2 Air Interface Evolution (3GPP2 AIE) standard and/or a 3GPP LTE-Advanced standard. In general, network 1100 may comprise any type of orthogonal-frequency-division-multiple-access-based (OFDMA-based) wireless network, for example, a WiMAX compliant network, a Wi-Fi Alliance Compliant Network, a digital subscriber-line-type (DSL-type) network, an asymmetric-digital-subscriber-line-type (ADSL-type) network, an Ultra-Wideband (UWB) compliant network, a Wireless Universal Serial Bus (USB) compliant network, a 4th Generation (4G) type network, and so on, and the scope of the claimed subject matter is not limited in these respects.

As an example of mobile wireless access, access service network (ASN) 1112 is capable of coupling with base station (BS) 1114 to provide wireless communication between subscriber station (SS) 1116 (also referred to herein as a wireless terminal) and Internet 1110. In one example, subscriber station 1116 may comprise a mobile-type device or information-handling system capable of wirelessly communicating via network 1100, for example, a notebook-type computer, a cellular telephone, a personal digital assistant, an M2M-type device, or the like. In another example, subscriber station is capable of providing an uplink-transmit-power control technique that reduces interference experienced at other wireless devices according to the subject matter disclosed herein. ASN 1112 may implement profiles that are capable of defining the mapping of network functions to one or more physical entities on network 1100. Base station 1114 may comprise radio equipment to provide radio-frequency (RF) communication with subscriber station 1116, and may comprise, for example, the physical layer (PHY) and media access control (MAC) layer equipment in compliance with an IEEE 802.16e-type standard. Base station 1114 may further comprise an IP backplane to couple to Internet 1110 via ASN 1112, although the scope of the claimed subject matter is not limited in these respects.

Network 1100 may further comprise a visited connectivity service network (CSN) 1124 capable of providing one or more network functions including, but not limited to, proxy and/or relay type functions, for example, authentication, authorization and accounting (AAA) functions, dynamic host configuration protocol (DHCP) functions, or domain-name service controls or the like, domain gateways, such as public switched telephone network (PSTN) gateways or Voice over Internet Protocol (VoIP) gateways, and/or Internet-Protocol-type (IP-type) server functions, or the like. These are, however, merely example of the types of functions that are capable of being provided by visited CSN or home CSN 1126, and the scope of the claimed subject matter is not limited in these respects.

Visited CSN 1124 may be referred to as a visited CSN in the case, for example, in which visited CSN 1124 is not part of the regular service provider of subscriber station 1116, for example, in which subscriber station 1116 is roaming away from its home CSN, such as home CSN 1126, or, for example, in which network 1100 is part of the regular service provider of subscriber station, but in which network 1100 may be in another location or state that is not the main or home location of subscriber station 1116.

In a fixed wireless arrangement, WiMAX-type customer premises equipment (CPE) 1122 may be located in a home or business to provide home or business customer broadband access to Internet 1110 via base station 1120, ASN 1118, and home CSN 1126 in a manner similar to access by subscriber station 1116 via base station 1114, ASN 1112, and visited CSN 1124, a difference being that WiMAX CPE 1122 is generally disposed in a stationary location, although it may be moved to different locations as needed, whereas subscriber station may be utilized at one or more locations if subscriber station 1116 is within range of base station 1114 for example. It should be noted that CPE 1122 need not necessarily comprise a WiMAX-type terminal, and may comprise other types of terminals or devices compliant with one or more standards or protocols, for example, as discussed herein, and in general may comprise a fixed or a mobile device. Moreover, in one exemplary embodiment, CPE 1122 is capable of providing an uplink-transmit-power control technique that reduces interference experienced at other wireless devices according to the subject matter disclosed herein.

In accordance with one or more examples, operation support system (OSS) 1128 may be part of network 1100 to provide management functions for network 1100 and to provide interfaces between functional entities of network 1100. Network 1100 of FIG. 11 is merely one type of wireless network showing a certain number of the components of network 1100; however, the scope of the claimed subject matter is not limited in these respects.

Figure 12:
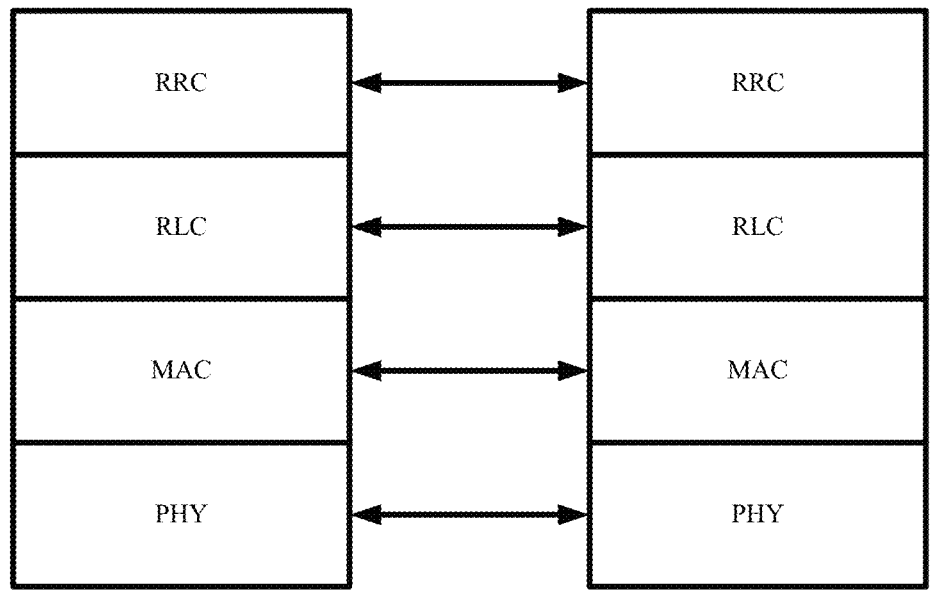
FIGS. 12 and 13 are schematic, block diagram illustrations, respectively, of radio interface protocol structures between a UE and an eNodeB based on a 3GPP-type radio access network standard in accordance with one or more exemplary embodiments disclosed herein.
Figure 13:
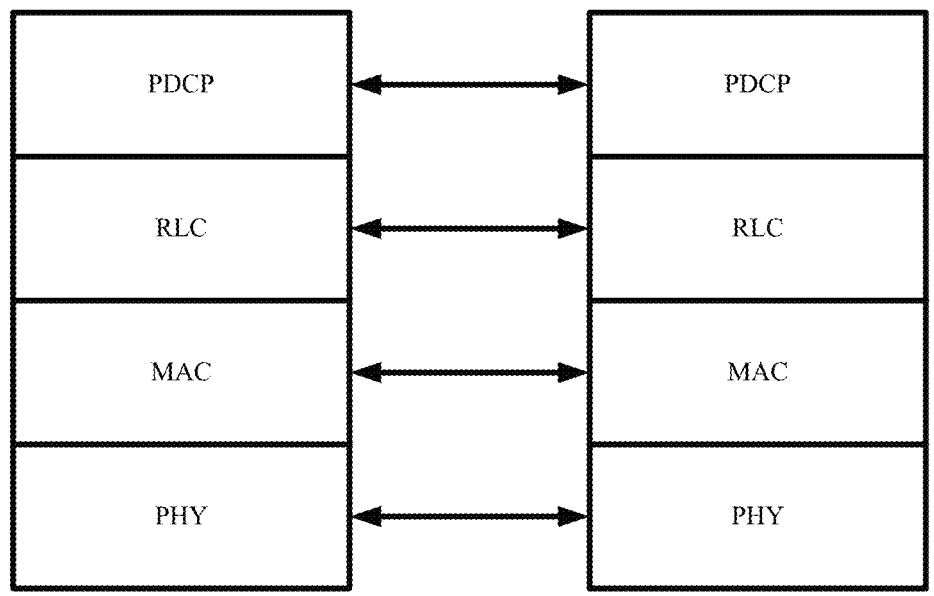

FIGS. 12 and 13 respectively depict exemplary radio interface protocol structures between a UE and an eNodeB that are based on a 3GPP-type radio access network standard and that is capable of providing an uplink-transmit-power control technique that reduces interference experienced at other wireless devices according to the subject matter disclosed herein. More specifically, FIG. 12 depicts individual layers of a radio protocol control plane and FIG. 13 depicts individual layers of a radio protocol user plane. The protocol layers of FIGS. 12 and 16 can be classified into an L1 layer (first layer), an L2 layer (second layer) and an L3 layer (third layer) on the basis of the lower three layers of the OSI reference model widely known in communication systems.

The physical (PHY) layer, which is the first layer (L1), provides an information transfer service to an upper layer using a physical channel. The physical layer is connected to a Medium Access Control (MAC) layer, which is located above the physical layer, through a transport channel. Data is transferred between the MAC layer and the PHY layer through the transport channel. A transport channel is classified into a dedicated transport channel and a common transport channel according to whether or not the channel is shared. Data transfer between different physical layers, specifically between the respective physical layers of a transmitter and a receiver is performed through the physical channel.

A variety of layers exist in the second layer (L2 layer). For example, the MAC layer maps various logical channels to various transport channels, and performs logical-channel multiplexing for mapping various logical channels to one transport channel. The MAC layer is connected to the Radio Link Control (RLC) layer serving as an upper layer through a logical channel. The logical channel can be classified into a control channel for transmitting information of a control plane and a traffic channel for transmitting information of a user plane according to categories of transmission information.

The RLC layer of the second layer (L2) performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets, such as IPv4 or IPv6 packets, in a radio interval with a narrow bandwidth. As a result, only information required for a header part of data can be transmitted, so that transmission efficiency of the radio interval can be increased. In addition, in an LTE-based system, the PDCP layer performs a security function that includes a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C plane, and the DRB is used as a transmission passage of user data in the U plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as Hybrid Automatic Repeat Request (HARQ) ACK or NACK Scheduling Request (SR) and Channel Quality Indicator (CQI) report information, received from first and second layers (L1 and L2).

Figure 14:
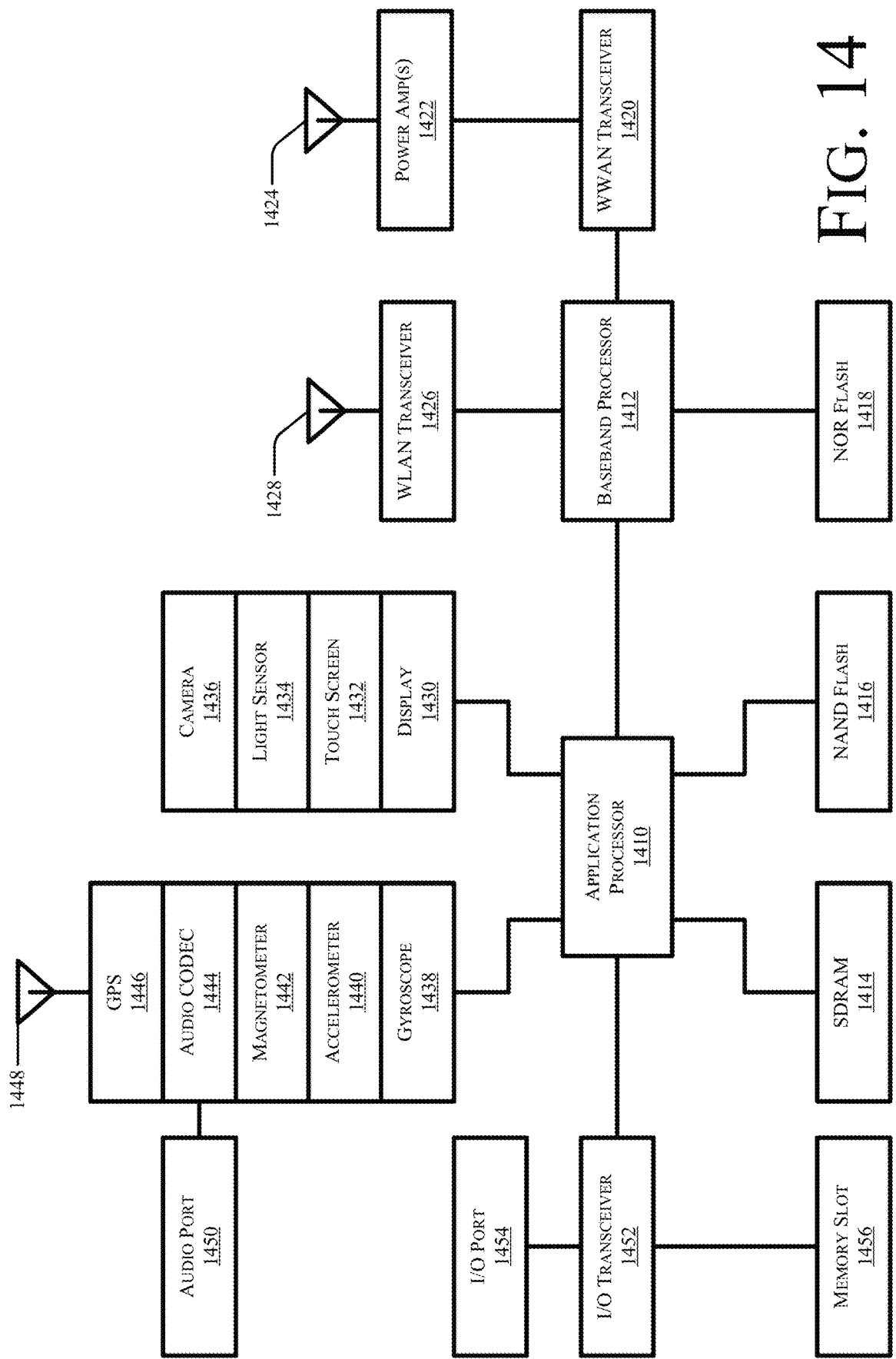
FIG. 14 is a schematic, block diagram illustration of an information-handling system in accordance with one or more exemplary embodiments disclosed herein.

FIG. 14 depicts an exemplary functional block diagram of an information-handling system 1400 that is capable of implementing methods to identify victims and aggressors according to the subject matter disclosed herein. Information handling system 1400 of FIG. 14 may tangibly embody one or more of any of the exemplary devices, exemplary network elements and/or functional entities of the network as shown in and described herein. In one example, information-handling system 1400 may represent the components of a UE 111 or eNB 110, and/or a WLAN access point 120, with greater or fewer components depending on the hardware specifications of the particular device or network element. In another example, information-handling system may provide M2M-type device capability. In yet another exemplary embodiment, information-handling system 1400 is capable of providing an uplink-transmit-power control technique that reduces interference experienced at other wireless devices according to the subject matter disclosed herein. Although information-handling system 1400 represents one example of several types of computing platforms, information-handling system 1400 may include more or fewer elements and/or different arrangements of elements than shown in FIG. 14, and the scope of the claimed subject matter is not limited in these respects.

In one or more examples, information-handling system 1400 may comprise one or more applications processor 1410 and a baseband processor 1412. Applications processor 1410 may be utilized as a general purpose processor to run applications and the various subsystems for information handling system 1400, and to capable of providing an uplink-transmit-power control technique that reduces interference experienced at other wireless devices according to the subject matter disclosed herein. Applications processor 1410 may include a single core or alternatively may include multiple processing cores wherein one or more of the cores may comprise a digital signal processor or digital signal processing core. Furthermore, applications processor 1410 may include a graphics processor or coprocessor disposed on the same chip, or alternatively a graphics processor coupled to applications processor 1410 may comprise a separate, discrete graphics chip. Applications processor 1410 may include on-board memory, such as cache memory, and further may be coupled to external memory devices such as synchronous dynamic random access memory (SDRAM) 1414 for storing and/or executing applications, such as capable of providing an uplink-transmit-power control technique that reduces interference experienced at other wireless devices according to the subject matter disclosed herein.

During operation, and NAND flash 1416 for storing applications and/or data even when information handling system 1400 is powered off.

In one example, a list of candidate nodes may be stored in SDRAM 1414 and/or NAND flash 1416. Further, applications processor 1410 may execute computer-readable instructions stored in SDRAM 1414 and/or NAND flash 1416 that result in an uplink-transmit-power control technique that reduces interference experienced at other wireless devices according to the subject matter disclosed herein.

In one example, baseband processor 1412 may control the broadband radio functions for information-handling system 1400. Baseband processor 1412 may store code for controlling such broadband radio functions in a NOR flash 1418. Baseband processor 1412 controls a wireless wide area network (WWAN) transceiver 1420 which is used for modulating and/or demodulating broadband network signals, for example, for communicating via a 3GPP LTE network or the like as discussed herein with respect to FIG. 14. The WWAN transceiver 1420 couples to one or more power amplifiers 1422 that are respectively coupled to one or more antennas 1424 for sending and receiving radio-frequency signals via the WWAN broadband network. The baseband processor 1412 also may control a wireless local area network (WLAN) transceiver 1426 coupled to one or more suitable antennas 1428 and that may be capable of communicating via a Bluetooth-based standard, an IEEE 802.11-based standard, an IEEE 802.16-based standard, an IEEE 802.18-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a 3GPP-LTE-Advanced-based wireless network, a UMTS-based protocol wireless network, a CDMA2000-based protocol wireless network, a GSM-based protocol wireless network, a cellular-digital-packet-data-based (CDPD-based) protocol wireless network, a Mobitex-based protocol wireless network, a Near-Field-Communications-based (NFC-based) link, a WiGig-based network, a ZigBee-based network, or the like. It should be noted that these are merely exemplary implementations for applications processor 1410 and baseband processor 1412, and the scope of the claimed subject matter is not limited in these respects. For example, any one or more of SDRAM 1414, NAND flash 1416 and/or NOR flash 1418 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 1410 may drive a display 1430 for displaying various information or data, and may further receive touch input from a user via a touch screen 1432, for example, via a finger or a stylus. In one exemplary embodiment, screen 1432 display a menu and/or options to a user that are selectable via a finger and/or a stylus for entering information into information-handling system 1400.

An ambient light sensor 1434 may be utilized to detect an amount of ambient light in which information-handling system 1400 is operating, for example, to control a brightness or contrast value for display 1430 as a function of the intensity of ambient light detected by ambient light sensor 1434. One or more cameras 1436 may be utilized to capture images that are processed by applications processor 1410 and/or at least temporarily stored in NAND flash 1416. Furthermore, applications processor may be coupled to a gyroscope 1438, accelerometer 1440, magnetometer 1442, audio coder/decoder (CODEC) 1444, and/or global positioning system (GPS) controller 1446 coupled to an appropriate GPS antenna 1448, for detection of various environmental properties including location, movement, and/or orientation of information-handling system 1400. Alternatively, controller 1446 may comprise a Global Navigation Satellite System (GNSS) controller. Audio CODEC 1444 may be coupled to one or more audio ports 1450 to provide microphone input and speaker outputs either via internal devices and/or via external devices coupled to information-handling system via the audio ports 1450, for example, via a headphone and microphone jack. In addition, applications processor 1410 may couple to one or more input/output (I/O) transceivers 1452 to couple to one or more I/O ports 1454 such as a universal serial bus (USB) port, a high-definition multimedia interface (HDMI) port, a serial port, and so on. Furthermore, one or more of the I/O transceivers 1452 may couple to one or more memory slots 1456 for optional removable memory, such as secure digital (SD) card or a subscriber identity module (SIM) card, although the scope of the claimed subject matter is not limited in these respects.

Figure 15:
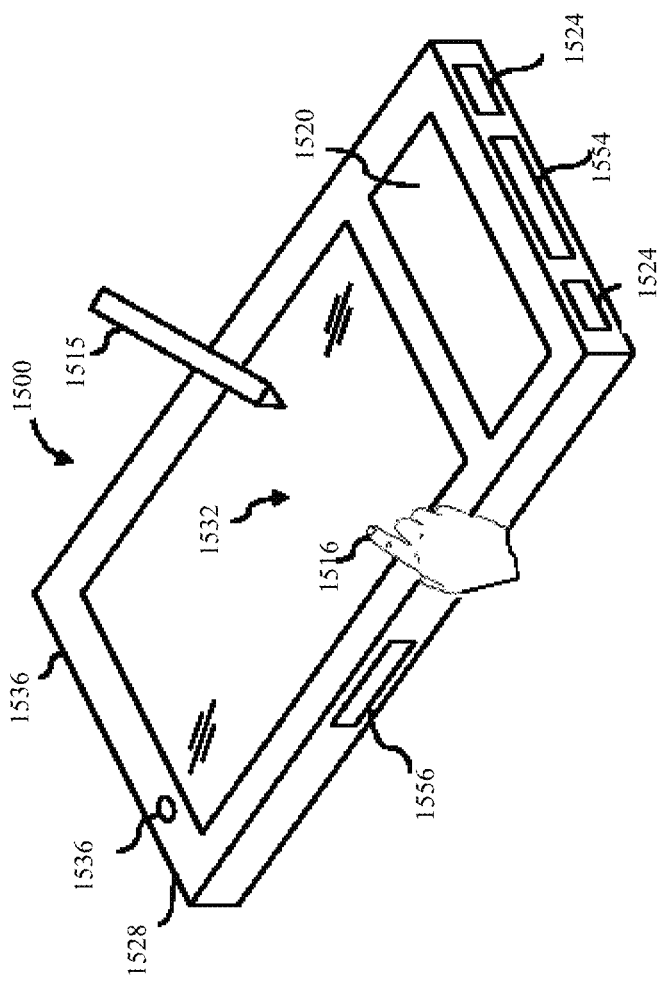
FIG. 15 is an isometric view of an exemplary embodiment of an information-handling system that optionally may include a touch screen in accordance with one or more embodiments disclosed herein.

FIG. 15 depicts an isometric view of an exemplary embodiment of the information-handling system of FIG. 14 that optionally may include a touch screen in accordance with one or more embodiments disclosed herein. FIG. 11 shows an example implementation of an information-handling system 1500 tangibly embodied as a cellular telephone, smartphone, smart-type device, or tablet-type device or the like, that is capable of implementing methods to identify victims and aggressors according to the subject matter disclosed herein. In one or more embodiments, the information-handling system a housing 1510 having a display 1030 that may include a touch screen 1032 for receiving tactile input control and commands via a finger 1516 of a user and/or a via stylus 1518 to control one or more applications processors 1410. The housing 1510 may house one or more components of information-handling system 1000, for example, one or more applications processors 1410, one or more of SDRAM 1414, NAND flash 1416, NOR flash 1418, baseband processor 1412, and/or WWAN transceiver 1420. The information-handling system 1500 further may optionally include a physical actuator area 1520 which may comprise a keyboard or buttons for controlling information-handling system 1000 via one or more buttons or switches. The information-handling system 1000 may also include a memory port or slot 1056 for receiving non-volatile memory, such as flash memory, for example, in the form of a secure digital (SD) card or a subscriber identity module (SIM) card. Optionally, the information-handling system 1000 may further include one or more speakers and/or microphones 1524 and a connection port 1554 for connecting the information-handling system 1500 to another electronic device, dock, display, battery charger, and so on. Additionally, information-handling system 1500 may include a headphone or speaker jack 1528 and one or more cameras 1536 on one or more sides of the housing 1510. It should be noted that the information-handling system 1500 of FIG. 15 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 16:
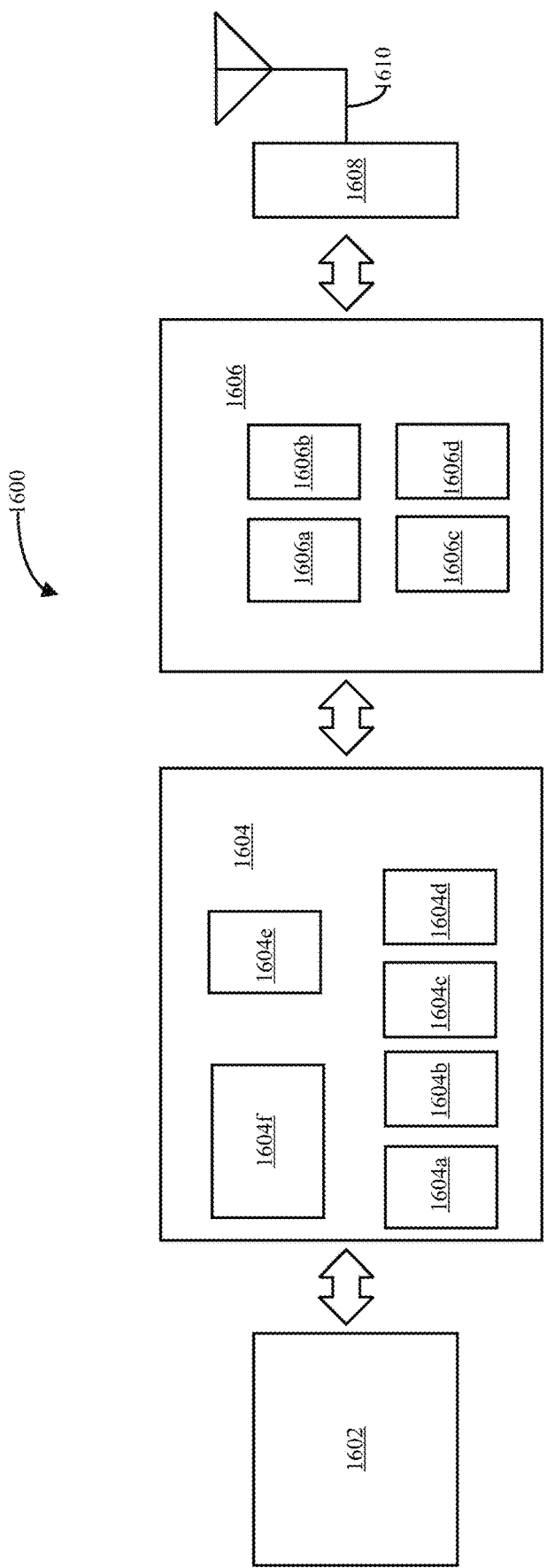
FIG. 16 is a schematic, block diagram illustration of components of a wireless device in accordance with one or more exemplary embodiments disclosed herein.

Embodiments described herein may be implemented into a system using any suitably configured hardware and/or software. FIG. 16 illustrates, for one embodiment, example components of a User Equipment (UE) device 1600. In some embodiments, the UE device 1600 may include application circuitry 1602, baseband circuitry 1604, Radio Frequency (RF) circuitry 1606, front-end module (FEM) circuitry 1608 and one or more antennas 1610, coupled together at least as shown.

The application circuitry 1602 may include one or more application processors. For example, the application circuitry 1602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1604 may include circuitry such as, but not limited to, one or more single-core or multi-core processors. The baseband circuitry 1604 may include one or more baseband processors and/or control logic to process baseband signals received from a receive signal path of the RF circuitry 1606 and to generate baseband signals for a transmit signal path of the RF circuitry 1606. Baseband processing circuitry 1604 may interface with the application circuitry 1602 for generation and processing of the baseband signals and for controlling operations of the RF circuitry 1606. For example, in some embodiments, the baseband circuitry 1604 may include a second generation (2G) baseband processor 1604a, third generation (3G) baseband processor 1604b, fourth generation (4G) baseband processor 1604c, and/or other baseband processor(s) 1604d for other existing generations, generations in development or to be developed in the future (e.g., fifth generation (5G), 6G, etc.). The baseband circuitry 1604 (e.g., one or more of baseband processors 1604a-d) may handle various radio control functions that enable communication with one or more radio networks via the RF circuitry 1606. The radio control functions may include, but are not limited to, signal modulation/demodulation, encoding/decoding, radio frequency shifting, etc. In some embodiments, modulation/demodulation circuitry of the baseband circuitry 1604 may include Fast-Fourier Transform (FFT), precoding, and/or constellation mapping/demapping functionality. In some embodiments, encoding/decoding circuitry of the baseband circuitry 1604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1604e of the baseband circuitry 1604 may be configured to run elements of the protocol stack for signaling of the PHY, MAC, RLC, PDCP and/or RRC layers. In some embodiments, the baseband circuitry may include one or more audio digital signal processor(s) (DSP) 1604f. The audio DSP(s) 1604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1604 and the application circuitry 1602 may be implemented together such as, for example, on a system on a chip (SOC).

In some embodiments, the baseband circuitry 1604 may provide for communication compatible with one or more radio technologies. For example, in some embodiments, the baseband circuitry 1604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1604 is configured to support radio communications of more than one wireless protocol may be referred to as multi-mode baseband circuitry.

RF circuitry 1606 may enable communication with wireless networks using modulated electromagnetic radiation through a non-solid medium. In various embodiments, the RF circuitry 1606 may include switches, filters, amplifiers, etc. to facilitate the communication with the wireless network. RF circuitry 1606 may include a receive signal path which may include circuitry to down-convert RF signals received from the FEM circuitry 1608 and provide baseband signals to the baseband circuitry 1604. RF circuitry 1606 may also include a transmit signal path which may include circuitry to up-convert baseband signals provided by the baseband circuitry 1604 and provide RF output signals to the FEM circuitry 1608 for transmission.

In some embodiments, the RF circuitry 1606 may include a receive signal path and a transmit signal path. The receive signal path of the RF circuitry 1606 may include mixer circuitry 1606a, amplifier circuitry 1606b and filter circuitry 1606c. The transmit signal path of the RF circuitry 1606 may include filter circuitry 1606c and mixer circuitry 1606a. RF circuitry 1606 may also include synthesizer circuitry 1606d for synthesizing a frequency for use by the mixer circuitry 1606a of the receive signal path and the transmit signal path. In some embodiments, the mixer circuitry 1606a of the receive signal path may be configured to down-convert RF signals received from the FEM circuitry 1608 based on the synthesized frequency provided by synthesizer circuitry 1606d. The amplifier circuitry 1606b may be configured to amplify the down-converted signals and the filter circuitry 1606c may be a low-pass filter (LPF) or band-pass filter (BPF) configured to remove unwanted signals from the down-converted signals to generate output baseband signals. Output baseband signals may be provided to the baseband circuitry 1604 for further processing. In some embodiments, the output baseband signals may be zero-frequency baseband signals, although this is not a requirement. In some embodiments, mixer circuitry 1606a of the receive signal path may comprise passive mixers, although the scope of the embodiments is not limited in this respect.

In some embodiments, the mixer circuitry 1606a of the transmit signal path may be configured to up-convert input baseband signals based on the synthesized frequency provided by the synthesizer circuitry 1606d to generate RF output signals for the FEM circuitry 1608. The baseband signals may be provided by the baseband circuitry 1604 and may be filtered by filter circuitry 1606c. The filter circuitry 1606c may include a low-pass filter (LPF), although the scope of the embodiments is not limited in this respect.

In some embodiments, the mixer circuitry 1606a of the receive signal path and the mixer circuitry 1606a of the transmit signal path may include two or more mixers and may be arranged for quadrature downconversion and/or upconversion respectively. In some embodiments, the mixer circuitry 1606a of the receive signal path and the mixer circuitry 1606a of the transmit signal path may include two or more mixers and may be arranged for image rejection (e.g., Hartley image rejection). In some embodiments, the mixer circuitry 1606a of the receive signal path and the mixer circuitry 1606a may be arranged for direct downconversion and/or direct upconversion, respectively. In some embodiments, the mixer circuitry 1606a of the receive signal path and the mixer circuitry 1606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1606 may include analog-to-digital converter (ADC) and digital-to-analog converter (DAC) circuitry and the baseband circuitry 1604 may include a digital baseband interface to communicate with the RF circuitry 1606.

In some dual-mode embodiments, a separate radio IC circuitry may be provided for processing signals for each spectrum, although the scope of the embodiments is not limited in this respect.

In some embodiments, the synthesizer circuitry 1606d may be a fractional-N synthesizer or a fractional N/N+1 synthesizer, although the scope of the embodiments is not limited in this respect as other types of frequency synthesizers may be suitable. For example, synthesizer circuitry 1606d may be a delta-sigma synthesizer, a frequency multiplier, or a synthesizer comprising a phase-locked loop with a frequency divider.

The synthesizer circuitry 1606d may be configured to synthesize an output frequency for use by the mixer circuitry 1606a of the RF circuitry 1606 based on a frequency input and a divider control input. In some embodiments, the synthesizer circuitry 1606d may be a fractional N/N+1 synthesizer.

In some embodiments, frequency input may be provided by a voltage controlled oscillator (VCO), although that is not a requirement. Divider control input may be provided by either the baseband circuitry 1604 or the applications processor 1602 depending on the desired output frequency. In some embodiments, a divider control input (e.g., N) may be determined from a look-up table based on a channel indicated by the applications processor 1602.

Synthesizer circuitry 1606d of the RF circuitry 1606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1606 may include an IQ/polar converter.

FEM circuitry 1608 may include a receive signal path which may include circuitry configured to operate on RF signals received from one or more antennas 1610, amplify the received signals and provide the amplified versions of the received signals to the RF circuitry 1606 for further processing. FEM circuitry 1608 may also include a transmit signal path which may include circuitry configured to amplify signals for transmission provided by the RF circuitry 1606 for transmission by one or more of the one or more antennas 1610.

In some embodiments, the FEM circuitry 1608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1606). The transmit signal path of the FEM circuitry 1608 may include a power amplifier (PA) to amplify input RF signals (e.g., provided by RF circuitry 1606), and one or more filters to generate RF signals for subsequent transmission (e.g., by one or more of the one or more antennas 1610.

In some embodiments, the UE device 1600 may include additional elements such as, for example, memory/storage, display, camera, sensor, and/or input/output (I/O) interface.

The following pertains to further examples.

Example 1 is an apparatus for an enhanced node B (eNB) capable to manage a bearer in a network comprising multiple radio access technology network access points, the apparatus comprising circuitry to determine a traffic splitting parameter comprising at least a first portion of the bearer to be allocated to the first network access point and a second portion of the bearer to be allocated to the second network access point in the network based at least in part on first transport parameters and the transport parameters, the first transport parameters comprising a first physical data rate and a first backhaul rate for a first network access point, the second transport parameters comprising a second physical data rate and a second backhaul rate for a second network access point and allocate the first portion of the bearer to the first network access point and the second portion of the bearer to the second network access point.

In Example 2, the subject matter of Example 1 can optionally include an arrangement in which the first network access point comprises the eNB and operates according to a first radio access technology the second network access point comprises a wireless local area network (WLAN) access point which operates according to a second RAT.

In Example 3, the subject matter of any one of Examples 1-2 can optionally include circuitry to determine the traffic splitting parameter based on the first transport parameters and the second transport parameters In Example 4, the subject matter of any one of Examples 1-3 can optionally include circuitry to transmit the traffic splitting parameter to the first network access point and the second network access point.

In Example 5, the subject matter of any one of Examples 1-4 can optionally include circuitry to selectively activate a bearer splitting function based on a ratio of a physical data rate to a load indicator for at least one network access point.

In Example 6, the subject matter of any one of Examples 1-5 can optionally include circuitry to allocate the first portion of the bearer and the second portion of the bearer based at least in part on maximizing a network utility function across multiple bearers in the network.

Example 7 is an apparatus for an enhanced node B (eNB) capable to manage a bearer in a network comprising multiple heterogeneous radio access technology network access points, the apparatus comprising circuitry to determine a first load indicator for the first network access point and a second load indicator for the second network access point based at least in part on first transport parameters and second transport parameters, the first transport parameters comprising a first physical data rate and a first backhaul rate for a first network access point, the second transport parameters comprising a second physical data rate and a second backhaul rate for a second network access point, and forward the first load indicator to the first network access point and the second load indicator to the second network access point.

In Example 8, the subject matter of Example 7 can optionally include an arrangement in which the first network access point comprises the eNB and operates according to a first radio access technology the second network access point comprises a wireless local area network (WLAN) access point which operates according to a second RAT.

In Example 9, the subject matter of any one of Examples 7-8 can optionally include circuitry to determine the first load indicator for the first network access point and the second load indicator for the second network access point based at least in part on maximizing a network utility function across multiple bearers in the network.

In Example 10, the subject matter of any one of Examples 7-9 can optionally include an arrangement in which the first network access point broadcasts the first load indicator to at least one user equipment (UE) and the second network access point broadcasts the second load indicator to the at least one UE.

In Example 11, the subject matter of any one of Examples 7-10 can optionally include an arrangement in which in response to the first load indicator and the second load indicator, the at least one UE determines a traffic splitting parameter comprising at least a first portion of the bearer to be allocated to the first network access point and a second portion of the bearer to be allocated to the second network access point in the network, and allocate the first portion of the bearer to the first network access point and the second portion of the bearer to the second network access point.

Example 12 is an apparatus for a network access point comprising circuitry to broadcast a first load indicator to at least one user equipment (UE), receive, from the at least one UE, a resource allocation request for bandwidth from the network access point, the bandwidth used to support at least a portion of a bearer associated with the at least one UE, and in response to the resource allocation request, to allocate transmission resources to the at least one UE.

In Example 13, the subject matter of Example 12 can optionally include circuitry to generate an updated load indicator on a periodic basis in response to resource allocation requests from a plurality of UE.

In Example 14, the subject matter of any one of Examples 12-13 can optionally include circuitry to broadcast the updated load indicator to the at least one UE.

Example 15 is an apparatus for a user equipment (UE) capable to manage a bearer in a network comprising multiple heterogeneous radio access technology network access points, the apparatus comprising circuitry to determine a traffic splitting parameter comprising at least a first portion of the bearer to be allocated to the first network access point and a second portion of the bearer to be allocated to the second network access point in the network based at least in part on a first load indicator from a first network access point and a second load indicator from a second network access point, and allocate the first portion of the bearer to the first network access point and the second portion of the bearer to the second network access point.

In Example 16, the subject matter of Example 15 can optionally include an arrangement in which the first network access point comprises an enhanced Node B (eNB) and operates according to a first radio access technology the second network access point comprises a wireless local area network (WLAN) access point which operates according to a second RAT.

In Example 17, the subject matter of any one of Examples 15-16 can optionally include circuitry to determine the traffic splitting parameter based on the first load indicator parameters and the second load indicator.

In Example 18, the subject matter of any one of Examples 15-17 can optionally include circuitry to transmit the traffic splitting parameter to the first network access point and the second network access point.

In Example 19, the subject matter of any one of Examples 15-18 can optionally include circuitry to allocate the first portion of the bearer and the second portion of the bearer based at least in part on maximizing a network utility function across multiple bearers in the network.

Example 20 is a non-transitory machine-readable medium comprising instructions which, when executed by a processor in an enhanced Node B (eNB) capable to manage a bearer in a network comprising multiple heterogeneous radio access technology network access points, configure the processor to determine a traffic splitting parameter comprising at least a first portion of the bearer to be allocated to the first network access point and a second portion of the bearer to be allocated to the second network access point in the network based at least in part on first transport parameters and the transport parameters, the first transport parameters comprising a first physical data rate and a first backhaul rate for a first network access point, the second transport parameters comprising a second physical data rate and a second backhaul rate for a second network access point and allocate the first portion of the bearer to the first network access point and the second portion of the bearer to the second network access point.

In Example 21, the subject matter of Example 20 can optionally include an arrangement in which the first network access point comprises the eNB and operates according to a first radio access technology the second network access point comprises a wireless local area network (WLAN) access point which operates according to a second RAT.

In Example 22, the subject matter of any one of Examples 20-21 can optionally include an arrangement in which the logic instructions further configure the processor to determine the traffic splitting parameter based on the first transport parameters and the second transport parameters In Example 23, the subject matter of any one of Examples 20-22 can optionally include an arrangement in which the logic instructions further configure the processor to transmit the traffic splitting parameter to the first network access point and the second network access point.

In Example 24, the subject matter of any one of Examples 20-23 can optionally include an arrangement in which the logic instructions further configure the processor to selectively activate a bearer splitting function based on a ratio of a physical data rate to a load indicator for at least one network access point.

In Example 25, the subject matter of any one of Examples 20-24 can optionally include an arrangement in which the logic instructions further configure the processor to allocate the first portion of the bearer and the second portion of the bearer based at least in part on maximizing a network utility function across multiple bearers in the network.

In various examples, the operations discussed herein may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one example" or "an example" means that a particular feature, structure, or characteristic described in connection with the example may be included in at least an implementation. The appearances of the phrase "in one example" in various places in the specification may or may not be all referring to the same example.

Also, in the description and claims, the terms "coupled" and "connected," along with their derivatives, may be used. In some examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus for an enhanced node B (eNB) capable to manage a bearer in a network comprising multiple radio access technology network access points, the apparatus comprising circuitry to:

determine a traffic splitting parameter comprising at least a first portion of the bearer to be allocated to the first network access point and a second portion of the bearer to be allocated to the second network access point in the network based at least in part on first transport parameters and the transport parameters, the first transport parameters comprising a first physical data rate and a first backhaul rate for a first network access point, the second transport parameters comprising a second physical data rate and a second backhaul rate for a second network access point, wherein the first network access point comprises the eNB and operates according to a first radio access technology the second network access point comprises a wireless local area network (WLAN) access point which operates according to a second RAT; and allocate the first portion of the bearer to the first network access point and the second portion of the bearer to the second network access point;

determine the traffic splitting parameter based on the first transport parameters and the second transport parameters; and transmit the traffic splitting parameter to the first network access point and the second network access point.

2. The apparatus for an eNB of claim 1, further comprising circuitry to:

selectively activate a bearer splitting function based on a ratio of a physical data rate to a load indicator for at least one network access point.

3. The apparatus for an eNB of claim 1, further comprising circuitry to:

allocate the first portion of the bearer and the second portion of the bearer based at least in part on maximizing a network utility function across multiple bearers in the network.

4. A non-transitory machine-readable medium comprising instructions which, when executed by a processor in an enhanced Node B (eNB) capable to manage a bearer in a network comprising multiple heterogeneous radio access technology network access points, configure the processor to:

determine a traffic splitting parameter comprising at least a first portion of the bearer to be allocated to the first network access point and a second portion of the bearer to be allocated to the second network access point in the network based at least in part on first transport parameters and the transport parameters, the first transport parameters comprising a first physical data rate and a first backhaul rate for a first network access point, the second transport parameters comprising a second physical data rate and a second backhaul rate for a second network access point, wherein the first network access point comprises the eNB and operates according to a first radio access technology the second network access point comprises a wireless local area network (WLAN) access point which operates according to a second RAT; and allocate the first portion of the bearer to the first network access point and the second portion of the bearer to the second network access point;

determine the traffic splitting parameter based on the first transport parameters and the second transport parameters; and transmit the traffic splitting parameter to the first network access point and the second network access point.

5. The non-transitory machine-readable medium of claim 4, wherein the instructions further configure the processor to:

selectively activate a bearer splitting function based on a ratio of a physical data rate to a load indicator for at least one network access point.

6. The non-transitory machine-readable medium of claim 4, wherein the instructions further configure the processor to:
allocate the first portion of the bearer and the second portion of the bearer based at least in part on maximizing a network utility function across multiple bearers in the network.

* * * * *